(12) United States Patent
Liu et al.

(10) Patent No.: US 8,499,019 B2
(45) Date of Patent: Jul. 30, 2013

(54) ELECTRONIC HARDWARE RESOURCE MANAGEMENT IN VIDEO PROCESSING

(75) Inventors: Yu Liu, Ottawa (CA); David Allan Ross, Nepean (CA); Kizito Gysbertus Antonius Van Asten, Kanata (CA)

(73) Assignee: Ross Video Limited, Nepean, Ontario (CA)

( * ) Notice: Subject to any disclaimer, the term of this patent is extended or adjusted under 35 U.S.C. 154(b) by 912 days.

(21) Appl. No.: 12/627,386

(22) Filed: Nov. 30, 2009

(65) Prior Publication Data

US 2011/0131265 A1 Jun. 2, 2011

(51) Int. Cl.
*G06F 17/17* (2006.01)
*G06F 17/10* (2006.01)

(52) U.S. Cl.
USPC ........... 708/313; 708/300; 708/303; 708/314; 708/322

(58) Field of Classification Search
None
See application file for complete search history.

(56) References Cited

U.S. PATENT DOCUMENTS

| | | | |
|---|---|---|---|
| 5,809,182 A | 9/1998 | Ward et al. | |
| 6,128,539 A | 10/2000 | Markandey et al. | |
| 6,335,990 B1 | 1/2002 | Chen et al. | |
| 6,427,157 B1 | 7/2002 | Webb | |
| 6,823,091 B2 | 11/2004 | Slavin | |
| 6,903,733 B1 | 6/2005 | Greenberg et al. | |
| 7,034,886 B2 | 4/2006 | Ross et al. | |
| 7,064,770 B2 | 6/2006 | Lachine et al. | |
| 7,333,141 B2 | 2/2008 | Hung | |
| 7,602,446 B2 | 10/2009 | Ross et al. | |
| 2005/0196072 A1* | 9/2005 | Zhong | 382/298 |
| 2005/0276430 A1* | 12/2005 | He et al. | 381/309 |
| 2007/0254592 A1* | 11/2007 | McCallister et al. | 455/67.11 |

OTHER PUBLICATIONS

Artur Krukowski, et al., "Almost Linear-Phase Polyphase IIR Lowpass/Highpass Filter Approach", 5th International Symposium on Signal Processing and its Applications (ISSPA99), Brisbane, Australia, Aug. 22-25, 1999, pp. 1-4.

Michael Weeks, et al., "A Hybrid Infinite/Finite Impulse Response (HIR) Filter", 45th IEEE Midwest Symposium on Circuits and Systems Proceedings (MWSCAS), Tulsa, Oklahoma, Aug. 4-7, 2002, Novel Circuits and Architecture Lecture session WAM1L-214.

Ed Catmull, et al., "3-D Transformations of Images in Scanline Order", ACM SIGGRAPH Computer Graphics, vol. 14, Iss. 3, Jul. 1980, pp. 1-18.

* cited by examiner

*Primary Examiner* — Scott Sun
(74) *Attorney, Agent, or Firm* — Nixon Peabody LLP; Jeffrey L. Costellia

(57) ABSTRACT

Apparatus and methods for electronic hardware resource management in video processing are provided. A hybrid filter is controllable to apply either Finite Impulse Response (FIR) filtering or Infinite Impulse Response (IIR) filtering for vertical filtering of a video image during a resizing process. A scale factor by which the video image is to be resized in the resizing process is determined, and the hybrid filter is controlled to apply FIR filtering for the vertical filtering where the determined scale factor satisfies a first condition relative to a threshold value $S_T$ or to apply IIR filtering for the vertical filtering where the determined scale factor satisfies a second condition relative to the threshold value $S_T$. The first and second conditions are different and exclusive, such that only one type of filtering is applied. This hybrid filtering approach uses each type of filtering to avoid defects of the other.

31 Claims, 11 Drawing Sheets

ELECTRONIC HARDWARE RESOURCE MANAGEMENT IN VIDEO PROCESSING

FIELD OF THE INVENTION

This invention relates generally to digital video processing, and particularly to management of electronic hardware resources for such processing.

BACKGROUND

Arbitrary resizing of digital video images is widely used in many video display applications. One of these applications is Digital Video Effect (DVE) processing in live video production devices where video images are translated, squeezed or expanded in arbitrary scales with sub-pixel precision. Examples of this type of application can be found in references such as U.S. Pat. No. 7,602,446 and U.S. Pat. No. 7,034,886.

Conventional techniques for video image resizing use poly-phase Finite Impulse Response (FIR) filtering. Poly-phase filter design is key to FIR-based image resizing, and therefore, developments in this area focus on various coefficients for anti-alias filtering and interpolation.

Based on the poly-phase FIR filtering techniques, multirate digital signal processing techniques and theories are well developed for general digital data rate conversion as well as video picture and image resizing. In poly-phase filtering, one-pass or one-stage filtering in the vertical direction requires multiple line buffers. This requirement increases the apparatus cost because of either use of internal memory such as Random Access Memory (RAM) storage or external memory devices. A conventional technique, for example, uses external ultra-high bandwidth Dynamic RAM (DRAM) to pre-store and reorganize video data in order to make the sizes of following line buffers smaller. Since DRAM technology, such as Double Data Rate DDR2/DDR3 Small Outline Dual In-line Memory Module (SODIMM) packages, is widely used and is available at lower prices, this type of technique achieves wide application. However, this method requires DRAM read bandwidth of K times the video data baseband if a K-tap FIR filter is applied, because each video data element in the DRAM is repeatedly read K times for one video data output.

An alternative to FIR filtering is Infinite Impulse Response (IIR) filter technology. IIR has an advantage of fewer terms or lower order than FIR to achieve the same magnitude performance. For instance, a 2nd-order IIR filter can achieve the magnitude performance provided by a 32nd-order FIR filter. In other words, only 2 line buffers in an IIR filter can perform the behaviour of 32 line buffers in an FIR filter, and therefore, an IIR filter can avoid need for extra internal or external memory.

However, an IIR filter has two major disadvantages, including nonlinear phase response and high ringing effect with asymmetrical impulse response. These two defects limit IIR filter usage in 2D video picture processing. IIR filter technology is often applied in an averaging function where the phase delay is not critical.

Directly using IIR filtering to perform an anti-alias function, for example, reveals that the ringing effect is more visible than the non-linear effect, particularly at filter pass band near the baseband of source data. For instance, direct use of IIR filtering in live special effects of video pictures produces a serious artefact such as multiple stripes that follow an edge or object boundary when the live special effect is to move pictures horizontally and/or vertically. The ringing effect or "Gibbs effect" is caused by a sharp transition from pass band to stop band in an IIR filter. That is, a narrow transition band IIR filter tends to produce ringing of at least 5%, and of 20% ringing magnitude when the cutoff frequency is near the baseband of source data.

With narrower bandwidth or a cutoff frequency father away from baseband, ringing becomes less pronounced. This characteristic is one of the main reasons why many applications use IIR to perform averaging.

In one IIR filtering technique, a filtering process starts with an IIR filter structure, counts the number of input zeros, and then checks the count number with a maximum setting. If the count number reaches the maximum setting, then the feedback/denominator terms of the IIR filter are cleared to zero. This changes the behaviour of the IIR magnitude response without changing cutoff-frequency-determined coefficients, and hence makes it difficult to control IIR filter performance, particularly when the filter bandwidth needs to consistently relate to a geometrical downscale.

SUMMARY

Some embodiments of the invention provide a hybrid FIR-IIR filter solution and also provide for efficient management of hardware resources such as electronic memory storage and multiplication components to achieve better performance of anti-alias filtering for an image resizing function, by combining FIR filtering and IIR filtering together in order to use each one to avoid defects from the other.

According to an embodiment of the invention, a filtering apparatus includes a hybrid filter that is controllable to apply either FIR filtering or IIR filtering for vertical tittering of a video image during a resizing process, and a controller operatively coupled to the hybrid filter. The controller determines a scale factor by which the video image is to be resized in the resizing process, and controls the hybrid filter to apply FIR filtering for the vertical filtering where the determined scale factor satisfies a first condition relative to a threshold value $S_T$ or to apply IIR filtering for the vertical filtering where the determined scale factor satisfies a second condition relative to the threshold value $S_T$. The first condition is different from the second condition.

In some embodiments, the scale factor is an inverse scale factor $s_{inv}$ of a linear geometrical inverse mapping function of the resizing process, and the controller controls the hybrid filter to apply FIR filtering where $s_{inv} \leq S_T$ or to apply IIR filtering where $s_{inv} > S_T$.

The threshold value $S_T$ could be a value calculated by determining a number of taps for the FIR filtering and a filter order for the IIR filtering; generating FIR filtering magnitude response curves $C_i^{FIR}(f)$ where $i \in [1,M]$ and $f \in [0,1]$ for M FIR filtering cutoff frequencies and N IIR filter magnitude response curves $C_j^{IIR}(f)$ where $j \in [1,N]$ and $f \in [0,1]$ for N IIR filtering cutoff frequencies; determining curve differences $$\sum_f W(f) \times |C_i^{FIR}(f) - C_j^{IIR}(f)|,$$

where $W(f)$ is a weight function, between FIR filtering magnitude response curves $C_i^{FIR}(f)$ and IIR filtering magnitude response curves $C_j^{IIR}(f)$; identifying the FIR filtering cutoff frequency $f_{min}^{FIR}$ associated with the FIR filtering magnitude response curve having a lowest determined curve difference; and calculating the threshold value $S_T = 1/f_{min}^{FIR}$.

A normalized filter bandwidth B is related to the inverse scale factor $s_{inv}$ as $B=1/s_{inv}$. The normalized filter bandwidth B and the inverse scale factor $s_{inv}$ are further related to a filter cutoff frequency as $s_{inv}=1/f_{cutoff}^{FIR}$ and $B=f_{cutoff}^{FIR}$ where FIR filtering is applied, and in a polynomial function of $s_{inv}$ and $f_{cutoff}^{IIR}$ with $B \neq f_{cutoff}^{IIR}$ where IIR filtering is applied.

A linear mapping function of the resizing process could include the linear geometrical inverse mapping function and a constant phase delay $\tau$ from either (i) an approximation $\bar{\tau}_{IIR}$ of IIR filtering phase delay where IIR filtering is applied or (ii) a constant FIR filtering phase delay $\tau_{FIR}$ where FIR filtering is applied.

The phase delay approximation $\bar{\tau}_{IIR}$ could be one of: an average of variable IIR filtering phase delay $\tau_{IIR}(f)$ within 3 dB bandwidth of the IIR filtering in the frequency domain such that $$\bar{\tau}_{IIR} = \frac{1}{B_{3dB}^{IIR}} \sum_{f=0}^{B_{3dB}^{IIR}} \tau_{IIR}(f);$$

and a sum of a statistically weighted variable phase delay $$\bar{\tau}_{IIR} = \sum_{f=0}^{1} w(f)\tau_{IIR}(f),$$

where w(f) is a statistical distribution function.

In some embodiments, the linear geometrical inverse mapping function is $x_{src}=\lfloor s_{inv} \times x_{tgt}+o_{inv}+\tau \rfloor$, where $\lfloor \bullet \rfloor$ denotes a floor operation, $x_{src}$ is an integer counter for source pixel location of each pixel in the video image prior to resizing, $x_{tgt}$ is an integer counter for target pixel location of each pixel in the video image after resizing, and $o_{inv}$ is a geometrical inverse shift offset. In this case, an output of the FIR filtering by the hybrid filter provides a target pixel value at location $x_{tgt}$ where FIR filtering is applied and an output of the IIR filtering by the hybrid filter provides part of a target pixel value at location $x_{tgt}$ where IIR filtering is applied.

The controller might also provide an indication that an output of the hybrid filter is valid where the linear geometric inverse mapping function is satisfied.

The hybrid filter may include common filtering components that support either FIR filtering or IIR filtering.

These common filtering components could include multiple video line buffers, each for storing a full video line of pixel data and either (i) supporting one denominator term and one numerator term of an IIR filter where IIR filtering is applied, or (ii) supporting two taps of an FIR filter where FIR filtering is applied.

The common filtering components could also include pairs of multipliers operatively coupled to each video line buffer to receive respective portions of the data stored in the video line buffers; a filtering coefficient generator, operatively coupled to the multipliers and to the controller, to provide a respective filtering coefficient to each multiplier, the filtering coefficients including filter tap coefficients where FIR filtering is applied and numerator and denominator coefficients where IIR filtering is applied; and respective adders operatively coupled to pairs of multipliers that receive the numerator coefficients and to pairs of multipliers that receive the denominator coefficients where IIR filtering is applied.

In some embodiment, the common filtering components also include respective shift elements, operatively coupled to at least one multiplier of each pair, to each adder, and to the controller. The shift elements apply a relative bit shift between outputs of the multipliers of each pair before addition occurs where IIR filtering is applied.

The common filtering components could also include a multiplexer operatively coupled to one of the video line buffers, to the controller, and to receive input data to be stored to the one of the video line buffers and a portion of the data stored in another one of the video line buffers. The multiplexer provides the received input data to the one of the video line buffers where IIR filtering is applied, and provides the received portion of the data stored in the other video line buffer to the one of the video line buffers where FIR filtering is applied.

The apparatus includes a filter output stage in some embodiments. The filter output stage is operatively coupled to the controller and to receive an output of the hybrid filter, and provides an additional FIR filter tap where FIR filtering is applied by the hybrid filter or a phase shift where IIR filtering is applied by the hybrid filter. The controller determines a mapping phase $p=(s_{inv} \times x_{tgt}+o_{inv}+\tau)-x_{src}$, and the phase shift could be based on the determined mapping phase, for example.

The filter output stage might include a first multiplier coupled to receive the output of the hybrid filter; a first multiplexer operatively coupled to the first multiplier and to the controller, to provide a constant to the first multiplier where FIR filtering is applied by the hybrid filter and to provide p to the first multiplier where IIR filtering is applied by the hybrid filter; a second multiplexer operatively coupled to the controller, to a delay element, and to receive the output of the hybrid filter and an output from a last line buffer of the hybrid filter, the second multiplexer providing the output of the hybrid filter to the delay element where IIR filtering is applied by the hybrid filter and providing the output from the last line buffer of the hybrid filter to the delay element where FIR filtering is applied by the hybrid filter; a second multiplier operatively coupled to the delay element; a third multiplexer operatively coupled to the second multiplier and to the controller, to provide a coefficient for the additional FIR filtering tap to the second multiplier where FIR filtering is applied by the hybrid filter and to provide 1-p to the second multiplier where IIR filtering is applied by the hybrid filter; and an adder operatively coupled to the first multiplier and to the second multiplier.

A coefficient initializer could be operatively coupled to the hybrid filter and to the controller to initialize the hybrid filter with either a first line of the video image where FIR filtering is applied, or with the first line of the video image multiplied with an initial coefficient value $c_{init}$ where IIR filtering is applied.

In some embodiments, the initializer includes a multiplier coupled to receive the first line of the video image and a multiplexer operatively coupled to the multiplier and to the controller, to provide a value of 1 to the multiplier where FIR filtering is applied by the hybrid filter, or the initial coefficient value $c_{init}$ as a reciprocal of a summation of numerator filtering coefficients from an IIR filter where IIR filtering is applied by the hybrid filter.

A filtering method is also provided, and involves determining a scale factor by which a video image is to be resized in a resizing process; and applying either Finite Impulse Response (FIR) filtering or Infinite Impulse Response (IIR) filtering for vertical filtering of the video image during the resizing process, by applying FIR filtering for the vertical filtering where the determined scale factor satisfies a first condition relative to a threshold value $S_T$ or applying IIR filtering for the vertical filtering where the determined scale factor satisfies a second condition relative to the threshold value $S_T$. As noted above, the first condition is different from the second condition.

The inverse scale factor $s_{inv}$ is an example of such a scale factor. The foregoing description also provides examples of the first and second conditions, how the threshold value might be determined, how a filter bandwidth and the inverse scale factor could be related to filter cutoff frequencies.

A method could also involve determining an approximation $\bar{\tau}_{IIR}$ of a variable IIR filtering phase delay $\tau_{IIR}(f)$ where IIR filtering is applied, by averaging the variable phase delay $\tau_{IIR}(f)$ within 3 dB bandwidth of the IIR filtering in the frequency domain such that $$\bar{\tau}_{IIR} = \frac{1}{B_{3dB}^{IIR}} \sum_{f=0}^{B_{3dB}^{IIR}} \tau_{IIR}(f),$$

or by summing a statistically weighted variable phase delay $$\bar{\tau}_{IIR} = \sum_{f=0}^{1} w(f) \tau_{IIR}(f),$$

where $w(f)$ is a statistical distribution function.

In some embodiments, the method also involves determining a linear mapping function for the resizing process. The linear mapping function includes the linear geometrical inverse mapping function and a constant phase delay $\tau$ from either (i) the phase delay approximation $\bar{\tau}_{IIR}$ where IIR filtering is applied or (ii) a constant FIR filtering phase delay $\tau_{FIR}$ where FIR filtering is applied. An example of the linear geometrical inverse mapping function is noted above.

The method could involve determining a mapping phase $p = (s_{inv} \times x_{tgt} + o_{inv} + \tau) - x_{src}$; determining a set of FIR filtering coefficients based on the determined mapping phase where FIR filtering is applied; and shifting the output of the IIR filtering based on the determined mapping phase where IIR filtering is applied. The method might then also involve providing an indication that an output of the FIR filtering or the IIR filtering is valid where the linear geometric inverse mapping function is satisfied.

Applying either FIR filtering or IIR filtering could involve controlling common filtering components to perform either FIR filtering or IIR filtering.

The method could also include initializing the FIR filtering with a first line of the video image where FIR filtering is applied, or initializing the IIR filtering with the first line of the video image multiplied with an initial coefficient value $c_{init}$ where IIR filtering is applied. The initial coefficient value $c_{init}$ is a reciprocal of a summation of numerator filtering coefficients from on IIR filter where IIR filtering is applied, in some embodiments.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Figure 1:
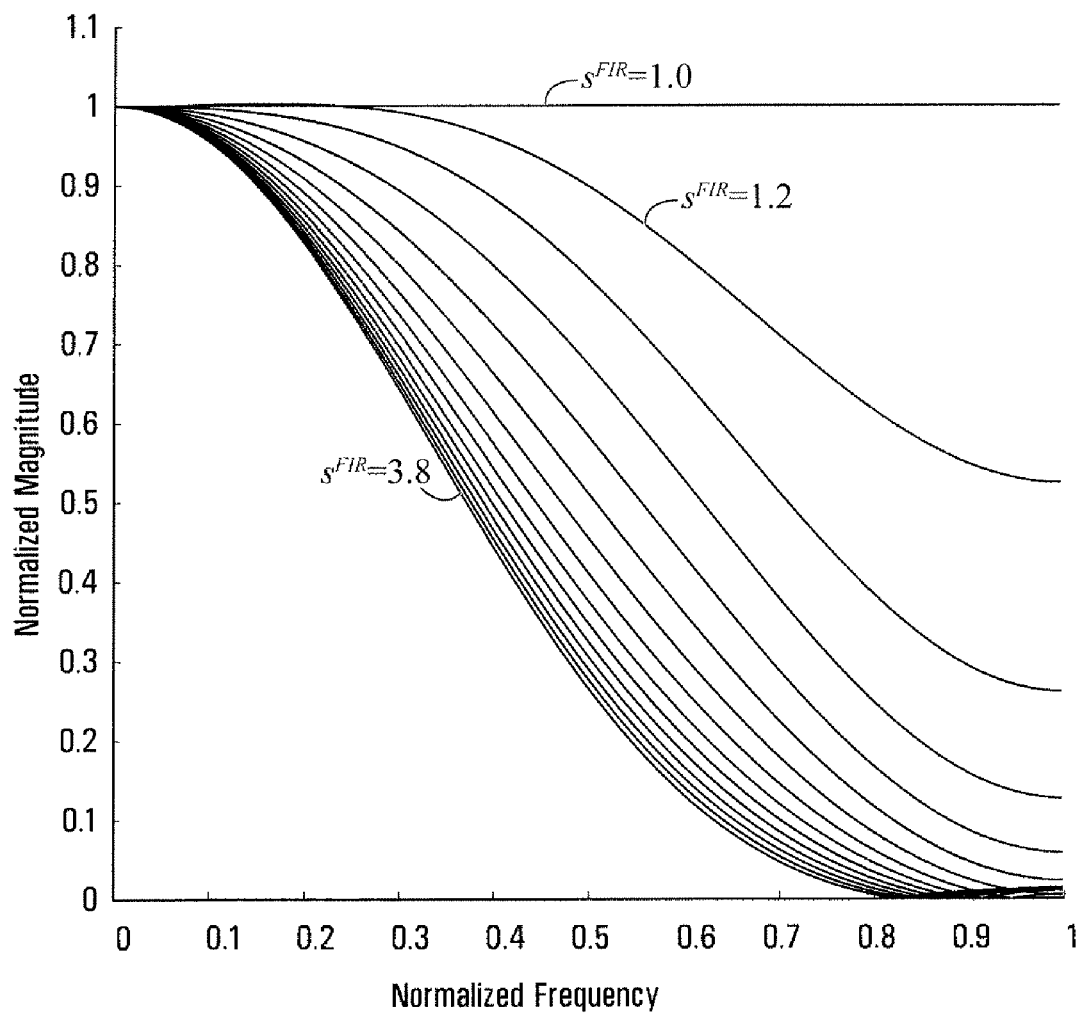
FIG. 1 shows a group of example magnitude response curves from a simulation of a 6-tap FIR filter.

Embodiments of the invention provide for efficient management of hardware resources such as electronic memory storage and multiplication components to achieve better performance of anti-alias filtering for an image resizing function. FIR filtering and IIR filtering are combined, in order to use each type of filtering to avoid defects of the other.

Hybrid FIR-IIR filtering solutions are thus proposed. FIR filtering is used, for example, if an inverse mapping geometrical scale factor is lower than a threshold $S_T$, and IIR filtering is used if the scale factor is greater than $S_T$. This type of hybrid technique is motivated by two facts: 1) an FIR filter with a small number of taps can sufficiently attenuate the stop band for a small geometrical scale with linear phase and small ringing effect; and 2) a small-order IIR filter can sufficiently attenuate the stop band for a large geometrical scale without significant ringing effect. Implementation of a small number of taps or small order involves fewer line buffers, and thus less internal memory resources, inside an Application Specific Integrated Circuit (ASIC) or Field Programmable Gate Array (FPGA) for instance, or less external memory chips for vertical anti-alias filtering of video image data.

One embodiment of hybrid FIR-IIR filtering involves determining FIR filter coefficients and IIR filter coefficients in order to facilitate seamless switching between FIR filtering and IIR filtering in terms of magnitude response. Generally, one type of filter has different magnitude response from the other type, even in the case of FIR filters having different coefficients and/or different numbers of taps and IIR filters having different coefficients and/or orders. For substantially seamless switching between FIR and IIR filtering, given the number of taps for FIR filtering and given the order for IIR filtering, a cutoff frequency $f_{cutoff}^{FIR}$ for an FIR filter and a cutoff frequency $f_{cutoff}^{IIR}$ for an IIR filter at which the FIR and IIR filters have the most similar magnitude response can be determined. The similar magnitude responses avoid video data glitches when switching between FIR and IIR filtering. Also, given $f_{cutoff}^{FIR}$ and $f_{cutoff}^{IIR}$ which have the most similar magnitude response, a threshold geometrical scale $S_T$ for inverse mapping can also be determined. The FIR filter and the IIR filter then have a consistent relationship with the geometrical resizing scale factor and anti-alias filter bandwidth.

Another embodiment involves determining an approximation of variable phase delay to a constant phase delay for IIR filtering. Although an IIR filter is of non-linear phase or variable phase delay, some research has presented various derivations of almost near linear phase IIR filters, but at the cost of restricting the magnitude response. When using IIR for anti-alias filtering and embedding it into geometrical resizing, the non-linear phase becomes unsolvable for a linear geometrical transform. In order to overcome the non-linear issue, an optimal approximation of non-linear to linear phase is produced. This approximation could involve objective judgment and/or subjective judgment by an observer of processed video images.

A further embodiment involves an inverse mapping function which not only implements a geometrical transform but also embeds the filter phase delay. When performing 2D image resizing in each direction from a source location $x_{src}$ to a target location $x_{tgt}$, either a forward linear mapping function or an inverse linear mapping function could be used. In an example forward function $s_{fwd} \times x_{src} + o_{fwd} = x_{tgt}$, $s_{fwd}$ is a forward scale factor and $o_{fwd}$ is a forward shift offset. An inverse linear mapping function of the form $s_{inv} \times x_{tgt} + o_{inv} = x_{src}$ includes an inverse scale factor $s_{inv}$ and an inverse shift offset $o_{inv}$. According to one embodiment of the invention, when implementing a geometrical mapping function, the filter delay, represented by a constant phase delay for an FIR filter and an approximated phase delay for an IIR filter, is embedded in the linear mapping function. For instance, if using the inverse mapping function, one embodiment uses $s_{inv} \times x_{tgt} + o_{inv} + \tau \rightarrow x_{src}$ where $\tau$ is the phase delay. By using such a method, no hardware or circuitry is required to compensate for the various filter delays. A further benefit is seamless switching between FIR and IIR filtering, as noted above, particularly in a live video special effect such as continuously shrinking a full size video image until vanishing in a screen.

Yet another embodiment of the invention also includes a topological circuitry structure in which the FIR and IIR filters share the same memory resources and the same multiplication resources. Although an IIR filter uses less terms or lower order, each term has a larger data size. For example, an IIR filter might store a single video pixel data in double the size of an FIR filter. The proposed topological circuitry structure splits one line buffer for IIR filtering into 2 line buffers for FIR filtering, and also splits each multiplication in IIR filtering into two portions, one for least significant bits (LSBs) and the other for most significant bits (MSBs). This type of topological circuitry structure seamlessly covers two cases, including one in which LSBs plus MSBs of one multiplication are treated as one data element from a line buffer for IIR filtering, and the other in which the LSBs and the MSBs are treated as separate data elements for FIR filtering.

According to another embodiment, a topological circuitry structure implements either (i) a function of phase shift or phase correction for IIR filtering or (ii) a function to support a filter tap for FIR filtering. An IIR filter is of variable phase delay with decimal precision. Therefore, any approximation of variable phase delay is also of decimal precision. By adding the phase delay to the inverse mapping function as described above, filtered and transformed video data is mapped onto a target grid, but between grid points. The phase shift or phase correction is used to shift the filtered data from the in-between positions onto the target grid points. In this embodiment, the function of phase shift or phase correction could be a simple two-point linear interpolation using one line buffer plus a multiplication element. On the other hand, the line buffer and multiplication element can also be used to implement a function which can support one more tap for an FIR filter, thus sharing the same hardware resources between IIR and FIR filtering.

Initial loading of pre-scaled data into line buffers could also be provided, in order to achieve an effect of seamless boundaries. Generally, a special effect like a top-layer video picture moving down on a screen should provide a seamless blending boundary between the top edge of moving-down video pictures and the exposed bottom-layer video pictures. One way to provide the seamless boundary is to assume that the top-layer video picture is surrounded by fillings in four directions. At the top edge of the top-layer video picture, the assumed filling is an infinite repetition of the first top line. The first filtered line is then assumed to result from the infinite repeated first line. In an FIR filter, this can be achieved by simply filling each line buffer with the first video line. Instead of directly filling the line buffers, the first video line is pre-multiplied with a special coefficient in the case of an IIR filter. In one embodiment, loading of the pre-filtered data also includes derivation of this special coefficient, and circuitry for the initial loading includes the circuitry to implement the pre-multiplication function.

These and other aspects of the invention are described in further detail below.

Threshold Scale Factor Value

Image resizing might use a geometrical transform to map a source grid to a target grid, or to inversely map a target grid to a source grid. Mathematically, if a target pixel at $x_{tgt}$ is inversely mapped onto a source pixel at $x_{src}$ using a scale factor $s_{inv}$ and shift offset $o_{inv}$, then the geometrical inverse mapping function is defined by:

$$x_{src} = s_{inv} \times x_{tgt} + o_{inv}. \qquad \text{Eq. 1}$$

If the scale factor $s_{inv} > 1$, then the source image is being shrunk or squeezed, by down sampling the source image data. Normally, anti-alias filtering is applied before down sampling occurs, and the scale factor $s_{inv}$ determines the normalized bandwidth B or the cutoff frequency $f_{cutoff}$ of anti-alias filtering. The anti-alias filter design should therefore associate the filter bandwidth with the geometrical scale factor.

The example provided below starts with a windowed-sinc FIR filter. The example sinc function represents an ideal low pass filter with bandwidth $B=1/s_{inv}$, and the magnitude response of a FIR filter can be used as a reference from which to select an IIR filter in order to avoid the IIR overshooting or ringing effect noted above.

Given a window function win(x) such as a Gaussian window, a Keiser window, etc., and given an inverse-mapping geometrical scale factors $s_{inv}$, a windowed-sinc anti-alias filter f(x) can be expressed in the time domain as $$f(t) = \text{win}(t) * \text{sinc}(t/s_{inv}) = W(x) * \frac{\sin(\pi t/s_{inv})}{\pi t/s_{inv}}. \qquad \text{Eq. 2}$$

Eq. 2 associates a geometrical scale factor with an anti-alias filter bandwidth B or cutoff frequency $f_{cutoff}$. In other words, a normalized cutoff frequency is the reciprocal of the inverse scale factor, $f_{cutoff} = 1/s_{inv}$, in this example.

FIG. 1 shows a group of example magnitude response curves from a simulation of a 6-tap FIR filter. It should be noted that the curves shown in FIG. 1, as well as those shown in FIGS. 2 and 3 and described below, are intended solely for the purposes of illustration. These curves were generated using simulation software, and similar or different response characteristics may be obtained by using different simulation software and/or settings, or observed in actual filter implementations. The present invention is in no way restricted to the response characteristics shown in the drawings, or to any other particular filter response characteristics.

With reference again to FIG. 1 each curve is related to a respective value of the inverse scale factor $s_{inv}$, which is denoted in the drawing as $s^{FIR}$ to distinguish the curves as relating to an FIR filter. As shown, the scale factor values in this example start from 1.0 and increment by 0.2 up to $s^{FIR}=3.8$. Because of the small number of taps, the incremental changes in the steepness of the transition band and depth of the stop band gradually become smaller as $s^{FIR}$ increases. When $s^{FIR}$ is larger than 2, for example, IIR filtering might be under consideration because of this decreasing incremental improvement in filter performance for this example 6-tap FIR.

Figure 2:
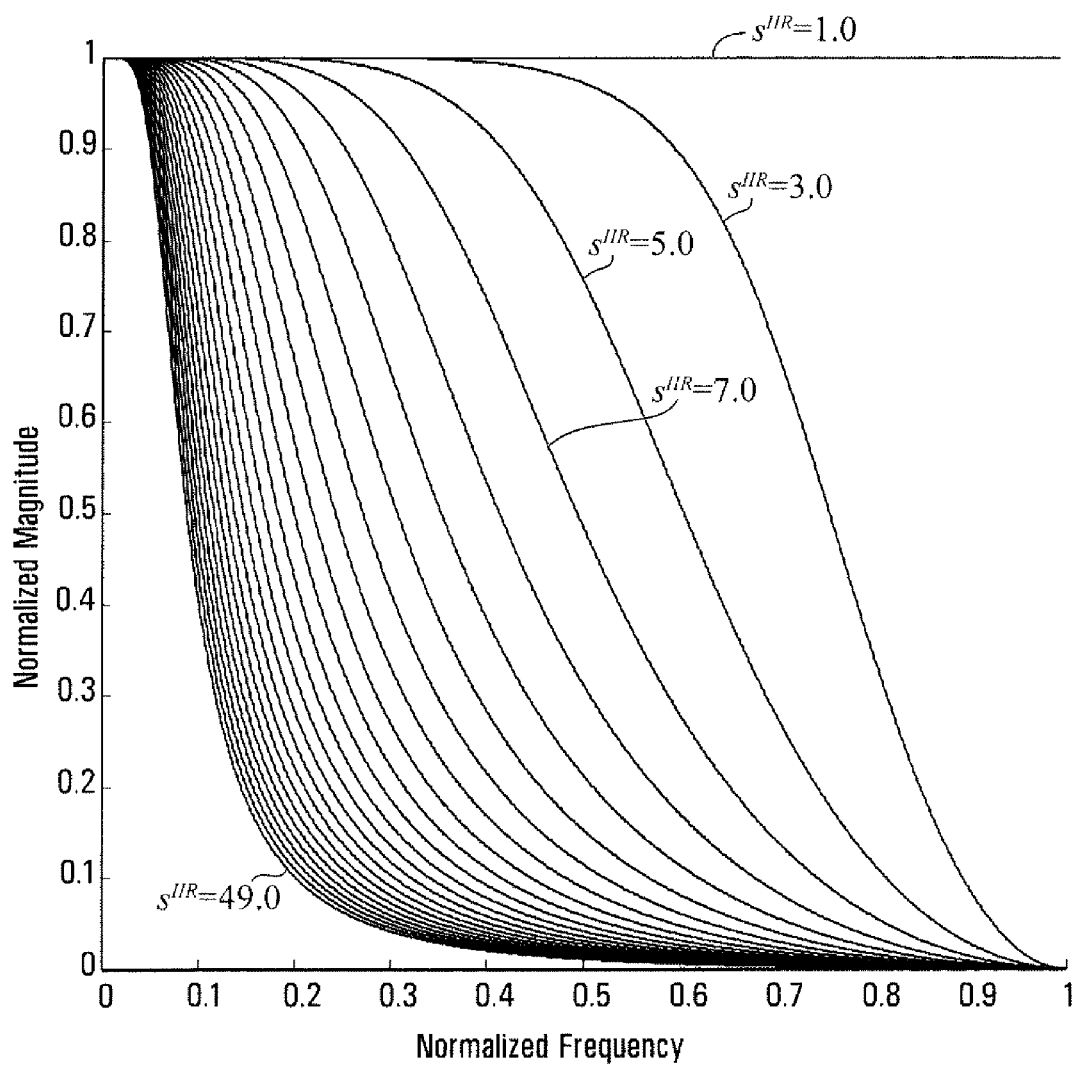
FIG. 2 shows a group of example magnitude response curves from a simulation of a 2nd-order Elliptic IIR filter.

FIG. 2 shows a group of example magnitude response curves from a simulation of a 2nd-order Elliptic IIR filter. Using a similar idea as in FIG. 1, the magnitude response curves in FIG. 2 correspond to respective IIR filtering cutoff frequencies $f_{cutoff}^{IIR}$, which are the reciprocal of the scale factor $s_{inv}=s^{IIR}$. In FIG. 2, $s^{IIR}$ starts from 1.0, but increments by 2 up to $s^{IIR}=49.0$. The cutoff frequency from the reciprocal of the scale factor also has a different meaning for an IIR filter, as will become apparent from the following description.

A further observation from FIGS. 1 and 2 is the fact that the IIR curve at scale factor $s^{IIR}=7.0$ is of higher similarity to the FIR curves around scale factors $s_{inv}$ of about 2~3. The magnitude responses of the example FIR and IIR filters can thus be matched to each other at the switching point, thereby reducing or even entirely avoiding visible glitches in a video image during resizing.

In some embodiments, a value for a threshold scale factor $S_T$ at which filtering is switched between FIR and IIR is determined based on an exhaustive search procedure. Such a procedure could involve producing a group of M FIR filtering magnitude response curves $C_i^{FIR}(f)$ where $i\in[1,M]$ and $f\in[0,1]$ starting at a cutoff frequency $f_i^{FIR}=1/s_i^{FIR}$ of 1 and decrementing by a step $\Delta f_{FIR}$ such as 0.01. A group of N IIR magnitude response curves $C_j^{IIR}(f)$ where $j\in[1.N]$ and $f\in[0,1]$ could similarly be produced, starting with a cutoff frequency $f_i^{IIR}=1/s_i^{IIR}$ of 1, and decrementing by a step $\Delta f_{IIR}$ such as 0.01. It should be appreciated that different frequency step sizes could be used, depending on how accurately the FIR and IIR magnitude responses are to be matched. A smaller step size would provide more curves within a smaller range of frequencies.

Although the resultant magnitude response curves could be compared for similarity, some embodiments also involve a weight function W(f), which could be used to emphasize particular parts of the magnitude responses for the purposes of determining similarity. For example, a weight function might have a value of 1 in the transition band and only 0.5 in the pass band and stop band. In one embodiment, the weight function emphasizes a band in a range of magnitude attenuation from 0.9 to 0.1 in the FIR magnitude response, and in this case the FIR magnitude response is thus used as a reference.

Search loops can then be conducted to find the minimal sum of curve differences. An example of this type of search can be expressed in a C-like description as $$\text{min\_sum} = \sum_f W(f) \times |C_2^{FIR}(f) - C_2^{IIR}(f)|;$$

min_fir = min_iir = 2;
for(i=2; i<=M; i++){
  for(j=2; j<=N; j++){

$$\text{sum} = \sum_f W(f) \times |C_i^{FIR}(f) - C_j^{IIR}(f)|;$$

-continued

```
    if (sum <min_sum){
        min_sum = sum;
        min_fir = i;
        min_irr = j;
    }
  }
}
```

The search loops begin with i=j=2, since for i=j=1 both the IIR and FIR magnitude response curves are flat "all pass" curves which are the same.

The minimum sum allows the magnitude response curves which have minimal differences, and thus are the most similar, to be identified. The corresponding filter cutoff frequencies are $f_{min}^{FIR}=1/s_{min}^{FIR}$ for the FIR filter and $f_{min}^{IIR}$ for IIR filter. Since the FIR filter is a reference in this example, the scale factor $s_{min}^{FIR}$ is the threshold scale factor value $S_T=s_{min}^{FIR}$ for switching between FIR and IIR filtering.

In order to make an IIR filter consistent with an FIR filter in terms of a relationship between filter bandwidth and geometrical scale, some embodiments also involve associating the geometrical scale factor $s_{inv}$ and the IIR cutoff frequency $f_{cutoff}^{IIR}$. Instead of assuming that the IIR cutoff frequency is the filter bandwidth, a frequency at 50% magnitude attenuation or 6 dB bandwidth is used. In the case of the above example sine-based FIR filter, this is approximately the magnitude attenuation at the switching scale factor threshold $S_T$ of about 2~3, as shown in FIG. 1. An example of a function to express a relationship between the geometrical scale factor $s_{inv}$ and the IIR cutoff frequency $f_{cutoff}^{IIR}=1/s_{IIR}$ is derived below.

A group of L IIR filters $F_i^{IIR}, i\in[1,L]$ is generated by setting the cutoff frequency $f_i^{IIR}=1/s_i^{IIR}$. The F notation represents a filter function which could be expressed as a z-transform or impulse response, and also entails various responses. In generating the IIR filters, $s_i^{IIR}$ starts from $1/f_{min}^{IIR}$ which was previously determined for $S_T$ and increments by $\Delta s_{IIR}$ such as 0.02. The 50% magnitude attenuation frequency or 6 dB filter bandwidth $B_i^{6dB}$ for each IIR filter $F_i^{IIR}$ can then be determined. A polynomial regression is used in one embodiment to fit a group of data pairs $\{s_i^{IIR}, 1/B_i^{6dB}\}, i\in[1,L]$, or group of pairs $\{s_i^{IIR}, s_{inv}\}$ where $s_{inv}=1/B_i^{6dB}$, and the result in this case is a linear function:

$$\alpha \times s_{inv} + \beta = s^{IIR} = \frac{1}{f_{cutoff}^{IIR}}, \qquad \text{Eq. 3}$$

where α and β are constants. Eq. 3 describes a clear mapping function from a given geometrical scale onto an IIR filter cutoff frequency, and is an illustrative example of a function which relates $s_{inv}$ and $f_{cutoff}^{IIR}$ where IIR filtering is applied. More generally, $s_{inv}$ could be related to $f_{cutoff}^{IIR}$ in a polynomial function, in which case a $1/s_{inv}$-determined filter bandwidth $B \neq f_{cutoff}^{IIR}$.

Phase Delay Approximation

Figure 3:
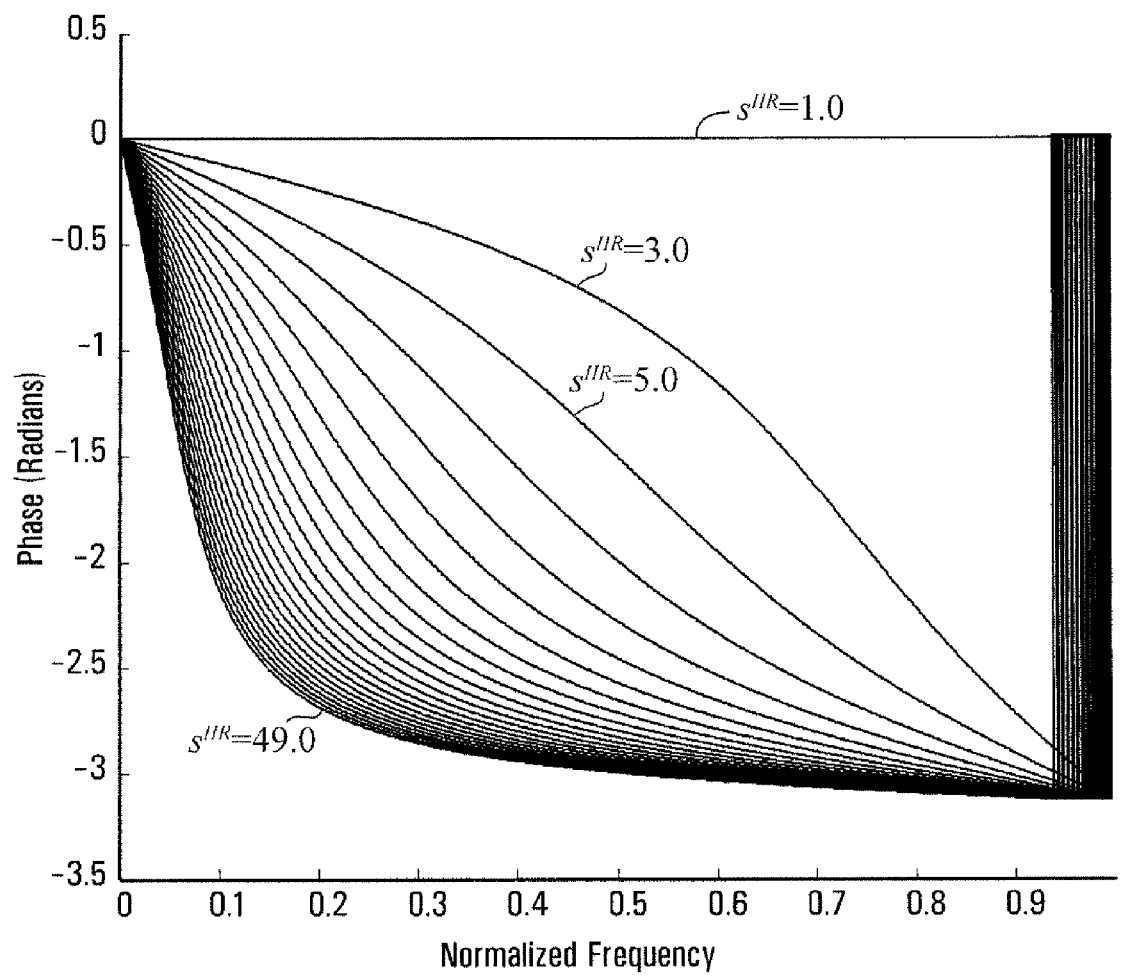
FIG. 3 shows a group of phase delay response curves from a simulation of a 2nd-order Elliptic IIR filter.

An IIR filter is of non-linear phase. FIG. 3 shows a group of phase delay response curves from a simulation of a 2nd-order Elliptic IIR filter. The non-linear phase $\phi(2\pi f)$ gives variable phase delay $$\tau_{IIR}(f) = -\frac{\varphi(2\pi f)}{2\pi f}. \qquad \text{Eq. 5}$$

There is no simple way to directly use a variable phase delay to determine when to output filtered video data from an IIR filter. According to an aspect of the present invention, an approximation of variable phase delay to a constant phase delay, illustratively an arithmetic average of the variable phase delay, is determined.

Given an IIR filter, then its 3 dB bandwidth $B_{3dB}^{IIR}$ can be determined, and its phase delay $\tau_{IIR}(f)$, $f<B_{3dB}^{IIR}$ can also be determined. Integrating a weighted version of the phase delay provides a constant phase delay approximation $\bar{\tau}_{IIR}$:

$$\bar{\tau}_{IIR} = \frac{1}{B_{3dB}^{IIR}} \int_0^{B_{3dB}^{IIR}} w(f)\tau_{IIR}(f)df \text{ in continuous form, or} \qquad \text{Eq. 4}$$

$$\bar{\tau}_{IIR} = \frac{1}{B_{3dB}^{IIR}} \sum_{f=0}^{B_{3dB}^{IIR}} w(f)\tau_{IIR}(f) \text{ in discrete form,}$$

where $w(f)$ is a weight function which in this example emphasizes the phase delay up to the 3 dB point.

As a result of the weight function $w(f)$, Eq. 4 does not consider any phase delay components beyond the 3 dB band. An IIR filter has high magnitude attenuation beyond this band, and hence non-linear phase components above this band would not be easily visible. Also, an IIR filter is used in accordance with embodiments of the invention for high inverse scale factors, which would involve heavy decimation or heavy down sampling of a source video image. Non-linear phase components beyond the 3 dB point would appear mostly in the stop band and become parts of alias images after down sampling, and therefore would be difficult for human vision systems to identify. In other words, the non-linear phase components which are de-emphasized by the weight function $w(f)$ would be hidden in highly attenuated alias images after down sampling.

This type of approximation could potentially be used without the weight function $w(f)$. Another possible approach for determining a phase delay approximation is to use a statistical mean to estimate a constant phase delay. To calculate the statistical mean, the weight function could be replaced with a statistical distribution function which is based on data collected from actual video images. The integral range could also be extended to the full spectral domain such that:

$$\bar{\tau}_{IIR} = \int_0^1 w(f)\tau_{IIR}(f)df, \text{ or } \bar{\tau}_{IIR} = \sum_{f=0}^1 w(f)\tau_{IIR}(f), \qquad \text{Eq. 5}$$

where $w(f)$ in this example is the statistical distribution function.

Inverse Mapping with Phase Delay

When the geometrical transform of Eq. 1 is applied to video images, implementations will generally follow raster scan order. For instance, the source and target coordinates $x_{src}$ and $x_{tgt}$ are replaced by integer counters which represent a pixel grid on a screen. The source counter $x_{src}$ indicates the input video data location, either horizontally or vertically.

The target counter $x_{tgt}$ indicates the output video location on a display screen. When the integer parts on the left and right sides of Eq. 1 are equal, the filter generates an output for the target position $x_{tgt}$. In other words, Eq. 1 is re-formed as:

$$x_{src} = \lfloor s_{inv} \times x_{tgt} + o_{inv} \rfloor, \qquad \text{Eq. 6}$$

where $\lfloor \cdot \rfloor$ is a floor operation.

A multiply and accumulate (MAC) is sometimes used to implement the right side of Eq. 6. In this case, the shift offset $o_{inv}$ is normally preloaded into the MAC component before starting to count $x_{src}$ and $x_{tgt}$. The fractional remainder that is truncated by the floor operation in Eq. 6 can be used as a phase for a poly-phase FIR filter or for a phase shift for an IIR filter, for example.

In accordance with an embodiment of the invention, the filter phase delay is embedded into the geometrical transform of Eq. 6 such that:

$$x_{src} = \lfloor s_{inv} \times x_{tgt} + o_{inv} + \tau \rfloor, \qquad \text{Eq. 7}$$

where filter phase delay $\tau$ is either a constant phase delay of $\tau_{FIR}$ of FIR filtering or a phase delay approximation $\bar{\tau}_{IIR}$ for IIR filtering, depending on which type of filter is applied during image resizing. The linear mapping function of Eq. 7, need not involve any additional hardware resources to compensate for filter delay. Also, this type of mapping can provide for seamless switching between FIR and IIR filters just by loading a different offset $(o_{inv}+\tau)$.

When the integer portions on each side of Eq. 7 are equal, the remainder noted above can be determined as:

$$p = (s_{inv} \times x_{tgt} + o_{inv} + \tau) - x_{src}. \qquad \text{Eq. 8}$$

The remainder $p$, also referred to herein as a mapping phase, could be used to select a phase-related coefficient set for a poly-phase FIR filter, or to shift the output result from an IIR filter. In video processing, the remainder $p$ is also termed sub-pix position.

Hybrid Filtering System Structure

Some embodiments of the invention relate to conserving hardware resources that are used for such purposes as memory storage and multiplications, by enabling the same hardware resources to support both FIR filtering and IIR filtering.

These features are described in detail below by way of an illustrative example, which is a 2nd-order IIR filter in form II. Form II uses the same delay terms for numerators and denominators in the rational polynomial expression, represented in z-transform for impulse response as:

$$F(z) = \frac{O(z)}{I(z)} = \frac{a_0 + a_1 z^{-1} + a_2 z^{-2}}{1 + b_1 z^{-1} + b_2 z^{-2}}, \qquad \text{Eq. 9}$$

where the a and b terms are coefficients.

Figure 4:
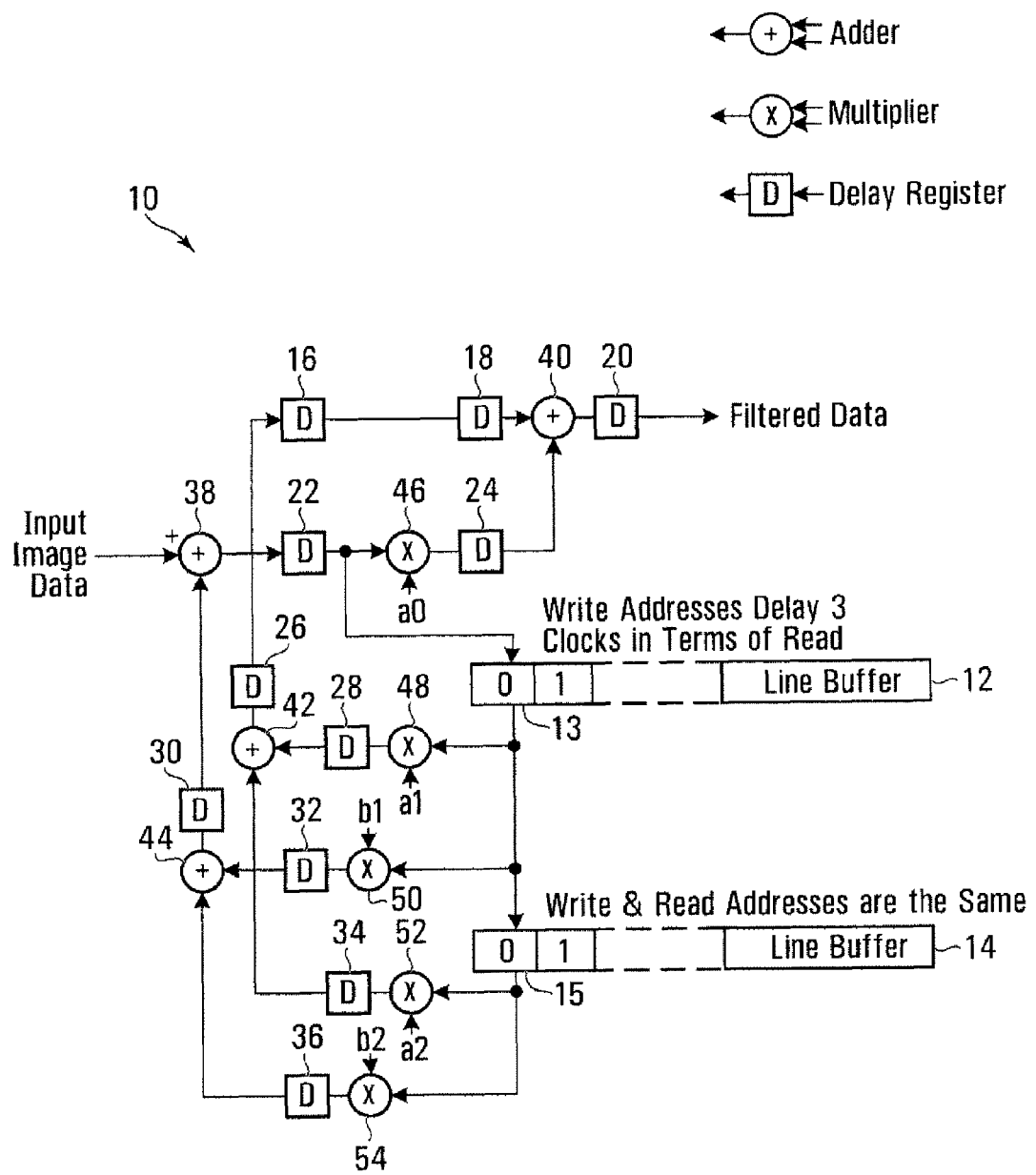
FIG. 4 is a block diagram of an example 2nd-order IIR filter in form II.

FIG. 4 is a block diagram of an example 2nd-order IIR filter 10 in form II. The example filter 10 includes two line buffers 12, 14, delay registers 16 to 36, adders 38 to 44, and multipliers 46 to 54. Such a filter could be used for vertical video data processing, with each line buffer 12, 14 functioning as a delay element represented in Eq. 9 as $z^{-1}$, $z^{-2}$. Each line buffer 12, 14 has a total width of full horizontal resolution such as 1920 elements 13, 15 for one high definition (HD) color component or 1920×2 elements for full horizontal data of HD video in 4:2:2 format. Each memory element 13, 15 is double the width of pixel color data in one embodiment. For instance, if the data for each video pixel is 10 bits wide, then each memory element 13, 15 of each line buffer 12, 14 is 20 bits wide.

According to an embodiment of the present invention, the data stored in each memory element 13, 15 of each line buffer 12, 14 is split into 2 portions, including 10 most significant bits (MSBs) and 10 least significant bits (LSBs), for example. This can be expressed as $D^0 = D_{msb}^0 \times 2^{10} + D_{lsb}^0$ for data in the first line buffer 12, and $D^1 = D_{msb}^1 \times 2^{10} + D_{lsb}^1$ for data in the second line buffer 14. The terms $(a_1 z^{-1} + a_2 z^{-2})$ and $(b_1 z^{-1} + b_2 z^{-2})$ in Eq. 9 are then equivalent to calculating:

$$a_1 D^0 + a_2 D^1 = a_1(D_{msb}^0 \times 2^{10} + D_{lsb}^0) + a_2(D_{msb}^1 \times 2^{10} + D_{lsb}^1) \quad \text{Eq. 10}$$
$$= (a_1 D_{msb}^0 + a_2 D_{msb}^1) \times 2^{10} + (a_1 D_{lsb}^0 + a_2 D_{lsb}^1),$$

and $$b_1 D^0 + b_2 D^1 = b_1(D_{msb}^0 \times 2^{10} + D_{lsb}^0) + b_2(D_{msb}^1 \times 2^{10} + D_{lsb}^1)$$
$$= (b_1 D_{msb}^0 + b_2 D_{msb}^1) \times 2^{10} + (b_1 D_{lsb}^0 + b_2 D_{lsb}^1).$$

Figure 5:
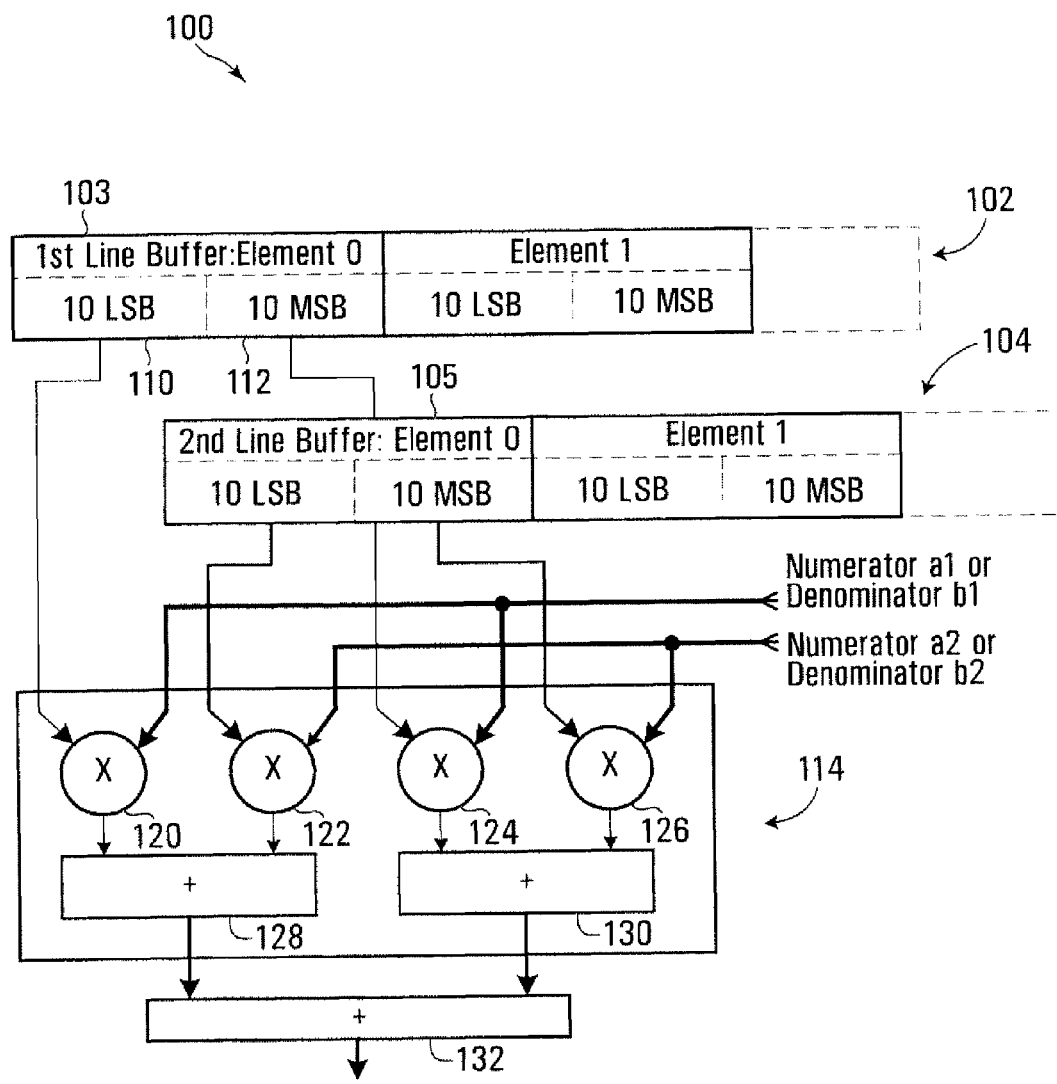
FIG. 5 is a block diagram illustrating a data split structure for terms in a 2nd-order IIR filter.

FIG. 5 is a block diagram illustrating a data split structure for terms in a 2nd-order IIR filter, and is effectively an interpretation of Eq. 10 into an example implementation. The example structure 100 includes two line buffers 102, 104 and illustrates the spitting of each line buffer memory element 103, 105 into LSB and MSB portions 110, 112. The terms in Eq. 10 are calculated in a multiply and add block 114, which includes multipliers 120, 122, 124, 126 and adders 128, 130. The multipliers 120, 122, 124, 126 are operatively coupled to the line buffers 102, 104 and to a coefficient generator (not shown) to receive filter coefficients. The adders 128, 130 and 132 perform the function of the adders 42, 44 in FIG. 4.

The original terms $(a_1 z^{-1} + a_2 z^{-2})$ in Eq. 9 involve 2 multiplications, but the data split illustrated in FIG. 5 results in 4 multiplications. However, this does not necessarily require more hardware resources. For instance, a primitive component for multiplication might offer 18 bits×18 bits in hardware resources such as ASIC/FPGA chips. If data to be multiplied includes more than 18 bits, then multiple primitive components would be combined together to form a larger multiplication. In the present example of 20-bit data $D^0$ and $D^1$, two 18×18 multipliers would be combined.

Therefore, while the data illustrated in FIG. 5 results in more multiplications, four instead of two, those four multiplications involve only 10-bit data, which can be accommodated in the same four 18×18 multipliers. The multiply and add block 114 could be implemented, for example, in primitive functions in hardware resources, such as Digital Signal Processor (DSP) blocks inside an FPGA, and therefore this data split can efficiently use available hardware resources instead of requiring additional resources to implement the data split.

The arithmetic operations could be implemented by the adders 128, 130, 132 in two's complement form. However, in this case $D_{lsb}^0$ and $D_{lsb}^1$ are treated as positive values regardless of original data signs. This is because $D^0 = D_{msb}^0 \times 2^{10} + D_{lsb}^0$ can also be expressed as $D^0 = D_{msb}^0 O + OD_{lsb}^0$, where $D_{msb}^0 O$ and $OD_{lsb}^0$ are $D_{msb}^0$ and $D_{lsb}^0$ concatenated with a 10-bit zero O. With data being split as shown in FIG. 5, $D_{msb}^0$ is a two's complement number with the original sign bit as the most significant bit, and $D_{lsb}^0$ is a two's complement number that does not include the original sign and therefore is treated as a positive number.

As will be apparent from Eq. 10, the products of the MSB portions and the coefficients would be shifted to the left by 10 bits and then added to the resultant products for the LSB portions by the adder 132. The LSB products could instead be shifted to the right by 10 bits prior to adding to the MSB portions. A shift function could be implemented as part of an add function in the adder 132 or separately.

To shift to the right, 10 zero bits are appended to the MSB product. For 10-bit data and 16-bit coefficients, for example, the MSB products would be 26 bits wide. After appending 10 zero bits, the result would be 36 bits of data, which would then be added to a 26-bit LSB product. By shifting LSB products to the right, a 26-bit LSB product in this example is truncated to 16 bits by discarding the 10 LSBs in the product, and the truncated 16-bit LSB product is then added to the 26-bit MSB product. The MSB shifting approach would not give rounding errors, but adds complexity due to the wider bits addition. The LSB approach gives rounding errors but saves hardware resources. A tradeoff between the rounding errors associated with LSB shifting and the resource cost of the MSB shifting could be applied by partially shifting the MSB products to the left and partially shifting the LSB products to the right. The partial shifts can provide the same relative shift between the MSB and LSB products, but might better balance the rounding errors and resource cost.

Figure 6:
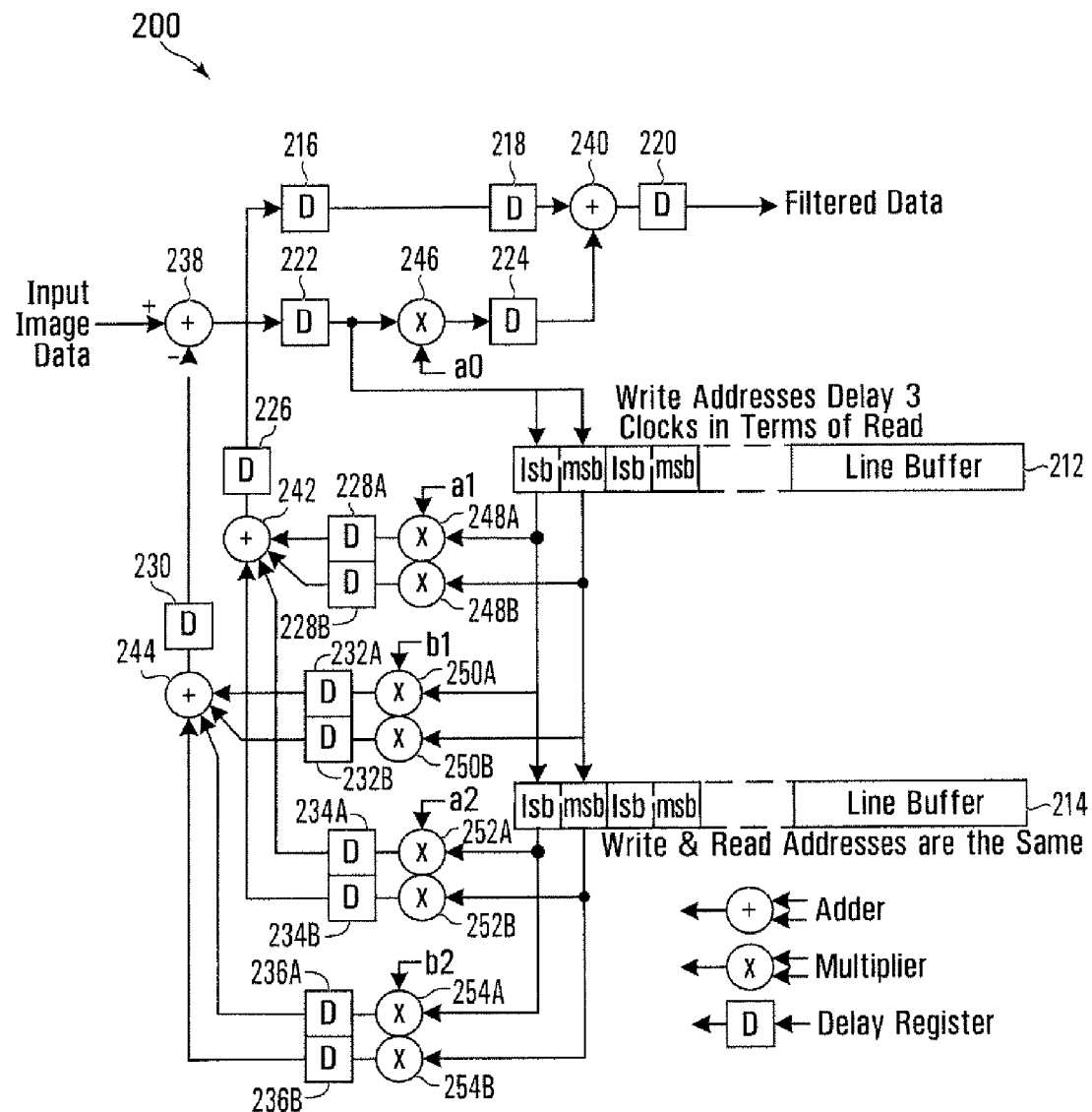
FIG. 6 is a block diagram of an example 2nd-order IIR filter implemented using a data split structure of the type shown in FIG. 5.

FIG. 6 is a block diagram of an example 2nd-order IIR filter 200 implemented using a data split structure of the type shown in FIG. 5 and the example IIR filter 10 of FIG. 4. As shown, the multiplications in the example filter 200 are split and re-combined. The example filter 200 is substantially similar to the example filter 10 of FIG. 4, and corresponding components in FIG. 6 have been labelled similarly to those in FIG. 4. The example filter 200 includes two line buffers 212, 214, delay registers 216 to 226 and 230, adders 238 to 244, and a multiplier 246, as in the example filter 10. In the example filter 200, however, the multipliers and delay registers which are involved in calculating filter terms from the data in the line buffers 212, 214 have been split into pairs of multipliers 248A/B, 250A/B, 252A/B, 254A/B and pairs of delay registers 228A/B, 232A/B, 234A/B, 236A/B.

Figure 7:
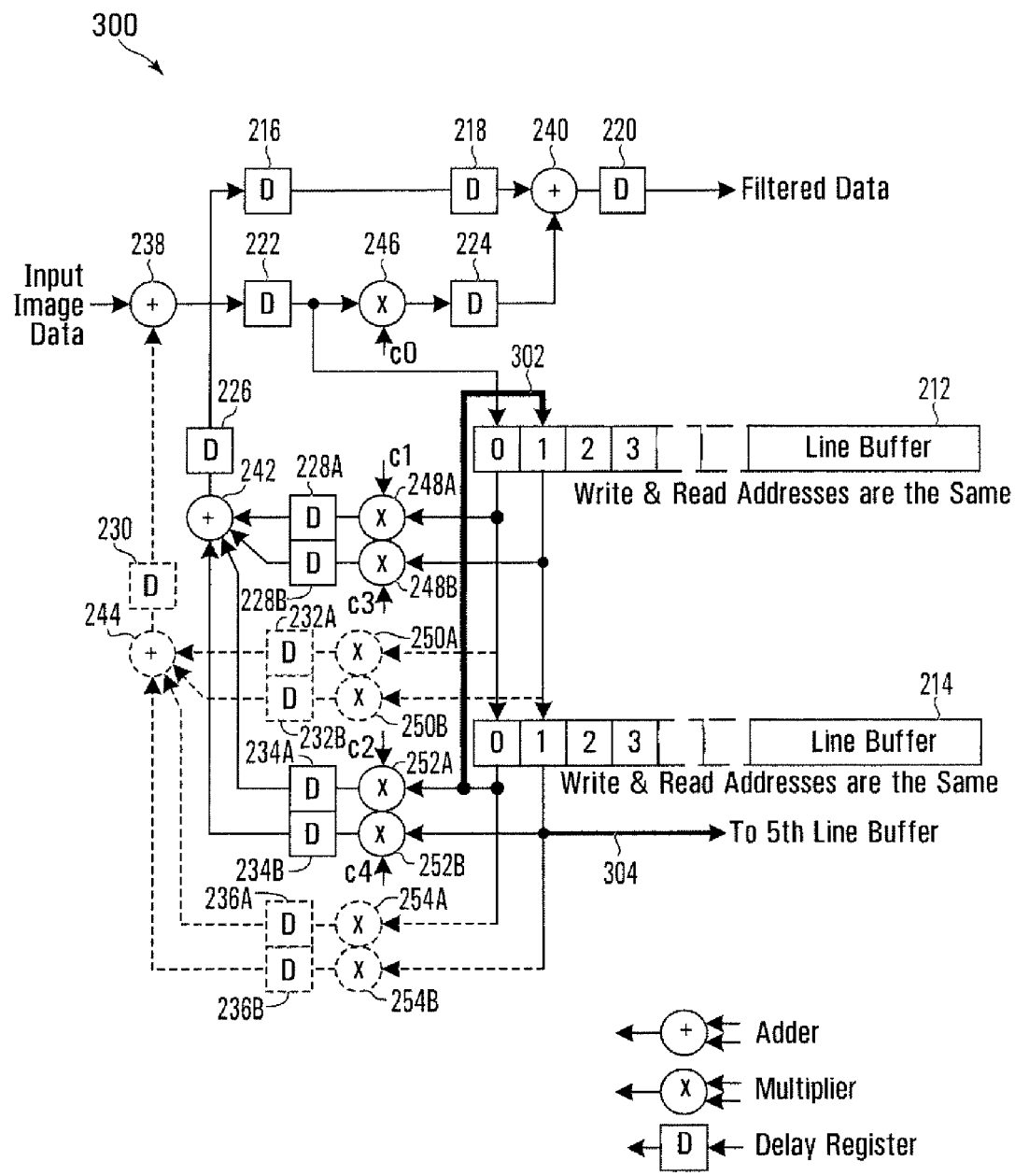
FIG. 7 is a block diagram of an example 5-tap poly-phase FIR filter.

FIG. 7 is a block diagram of an example 5-tap poly-phase FIR filter 300. This example filter 300 actually uses the same components as the example IIR filter 200 in FIG. 6, with the addition of a further connection 302. This connection 302 and different coefficients enable the same physical components to be used as an FIR filter 300. For example, the multipliers of the pair 248A/B are supplied with the same numerator coefficient $a_1$ in the example IIR filter 200, whereas those multipliers receive different FIR filtering coefficients $c_1$ and $c_3$ in the example FIR filter 300. The multipliers 252A/B also receive the same coefficient in the example IIR filter 200 but different coefficients in the example FIR filter 300. The coefficients $b_1$ and $b_2$ for IIR filtering as shown in FIG. 6 are also set to zeros in FIG. 7 in order to eliminate the denominator terms for FIR filtering.

The example 5-tap FIR filter 300 has coefficients $\{c_0, c_1, c_2, c_3, c_4\}$. The output data line 304 from the second memory element of the second line buffer 214 can be used to implement a cascade function for one more FIR filter tap, as described in further detail below.

Common Components for IIR Phase Shift/Correction and FIR Tap

The fractional remainder p of Eq. 8 is also known as a phase in signal processing or as sub-pixel position in video processing. For poly-phase FIR filter, such a phase can be used as an index which indicates a set of FIR filtering coefficients $$\{c_0^p, c_1^p, c_2^p, \ldots\}$$

corresponding to that phase p. For an IIR filter, filtered video data are shifted by the phase p.

Figure 8:
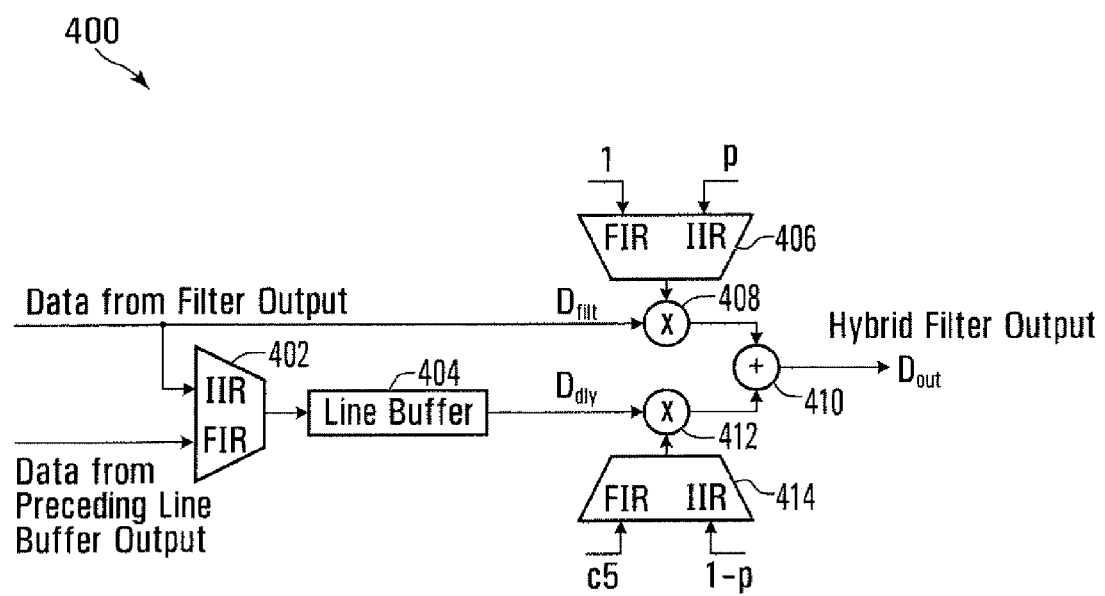
FIG. 8 is a block diagram of n example filter output stage.

In one embodiment, a common physical structure can be used to either provide a phase shift or support an FIR filter tap. FIG. 8 is a block diagram of a filter output stage having such a structure. The example output stage 400 includes three multiplexers 402, 406, 414, a line buffer 404, multipliers 408, 412, and an adder 410. The input of the line buffer 404 is fed by either filtered data or an output of the second memory element of the second line buffer 214 (FIGS. 6 and 7). Using the notation in FIG. 8, in which the filter output data is $D_{filt}$ and line-buffer delayed data from the line buffer 404 is $D_{dly}$, the example output stage 400 provides an overall hybrid filter output $D_{out}$ as:

$$D_{out} = \begin{cases} D_{filt} + c_5 \times D_{dly} & \text{for FIR filtering} \\ p \times D_{filt} + (1-p) \times D_{dly} & \text{for IIR filtering} \end{cases} \quad \text{Eq. 11}$$

where $c_5$ is a sixth FIR coefficient.

Figure 9:
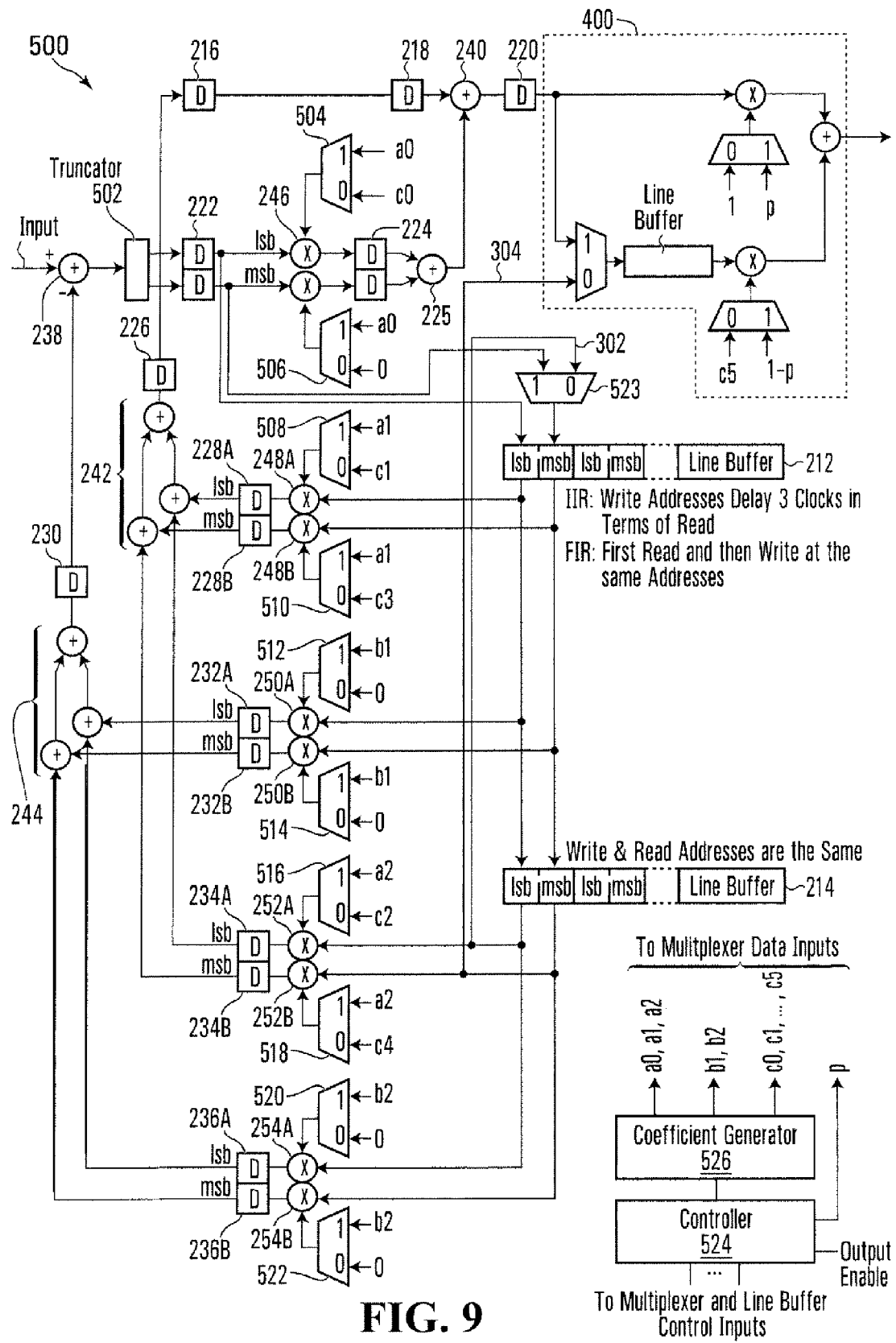
FIG. 9 is a block diagram of an example hybrid filtering apparatus.

The various features shown in FIGS. 5 to 8 and described above could potentially be implemented separately, or combined into a hybrid FIR-IIR filter structure, such as the example apparatus 500 shown in block diagram form in FIG. 9. The example apparatus 500 can be controlled to function either as a 2nd-order IIR filter or a 6-tap FIR filter.

The example apparatus 500 incorporates structures from the preceding drawings, and common components have been labelled similarly. In FIG. 9, multiplexers 504 to 523 have been shown as an example of a type of element that could be used to provide selectivity between FIR and IIR operation. It should be appreciated, however, that such selectivity does not necessarily entail a physical requirement for additional hardware resources. The "0" and "1" labels in the multiplexers 504 to 523 and in the output stage 400 are intended to designate which multiplexer input is provided at a multiplexer output for FIR filtering ("0") or for IIR filtering ("1"), and not necessarily the actual values of the inputs or the outputs. Although the labels "FIR" and "IIR" have been used, for example, in the multiplexers 406, 414 in FIG. 8, alternate labels have been used in FIG. 9 due to space limitations in the drawing.

Instead of multiplexer-based selectivity, coefficients for either FIR filtering or IIR filtering could be programmable parameters that are fed into the various multipliers without first being conducted by a multiplexer or other selector. A processing element such as a Central Processing Unit (CPU) or microprocessor could be configured to select an appropriate coefficient set, depending on whether IIR filtering or FIR filtering is to be applied to a video image, and to provide the coefficients of the selected set to the multipliers. Filter coefficients could be pre-computed and stored in a data buffer that is provided in a memory device, for example. FIR or IIR coefficients could then be supplied to the various multipliers by controlling the data buffer to output filter coefficients from particular addresses. Thus, filter control and coefficient selectivity could, but need not necessarily, be indirect through multiplexers or other selection elements.

The controller 524 and the coefficient generator 526 are intended to represent elements that are involved in operation of a hybrid filter by providing control signals and/or parameters to components of the hybrid filter. The controller 524, for example, controls which type of filtering is applied by the hybrid filter, by controlling the filtering coefficients that are used and selecting between different data inputs in the case of the multiplexer 523 and the multiplexer 402 in the output stage 400. The controller 524 might also control when data contents of memory elements in the line buffers 212, 214 are written and/or read. The phase p is also calculated by the controller 524 in some embodiments, and provided to the multiplexers 406, 414 in the output stage 400. As shown in FIG. 9, the controller 524 may also provide an output enable signal, which indicates when an output of the hybrid filter is valid. Coefficients that are provided by the coefficient generator 526 could be pre calculated, by the coefficient generator or possibly another component, and stored in a data buffer inside the coefficient generator as noted above. These and/or other functions of the controller 524 and the coefficient generator 526 could potentially be implemented using hardware, firmware, components which execute software, or some combination thereof. In a complete implementation of a video processing system, the controller 524 and the coefficient generator 526 could be implemented as part of an overall video processing controller.

FIG. 9 also shows an MSB/LSB data split and recombination path following the adder 238. The truncator 502 splits the data output by the adder 238, which subtracts a feedback signal from the input video image data where IIR filtering is applied. The delay register 222, the multiplier 246, and the delay register 224 in this case each include MSB and LSB components, and the MSB and LSB portions of data are recombined by the adder 225.

Initialization of IIR Delay Terms

In video editing, when layering and resizing one video image over another video background, seamless switching across borders between the resized image and the background image is generally preferred. If an assumption is made that any size-limited video image is surrounded by a constant color such as black, it is simple and convenient for hardware designs to initialize a filter just by filling areas outside the valid image area with constant data such as zeros. However, this simple method introduces that constant color into image boundaries, particularly if narrow bandwidth filtering is applied. For example, if the constant color is black, viewers will see a squeezed video image always surrounded by black borders or dark boundaries.

One way to avoid the border artifact is to crop a filtered video image for clean boundaries. However, such a solution sacrifices valid image areas, which might not be acceptable in high quality video applications such as in the video broadcast industry.

In accordance with a further embodiment of the present invention, source video images are assumed to be surrounded by infinitely repeated boundary pixels. For instance, the assumed fillings over the top and below the bottom of an image are repetition of the first video line above the top and repetition of the last video line below the bottom. As noted above, this assumption involves pre-filling all line buffers with the first line of the video image when FIR filtering is applied. For IIR filtering, however, the pre-fill data would be the first line pre-multiplied with constants. An example of a constant multiplicand that could be applied to initializing IIR filtering is derived below.

Referring again to Eq. 9, this equation can be expressed by using input I(z) and output O(z) as:

$$O(z) = (a_0 + a_1 z^{-1} + a_2 z^{-2}) \times \frac{I(z)}{1 + b_1 z^{-1} + b_2 z^{-2}} = \quad \text{Eq. 12}$$
$$(a_0 + a_1 z^{-1} + a_2 z^{-2}) \times U(z)$$

-continued where $$U(z) = \frac{I(z)}{1 + b_1 z^{-1} + b_2 z^{-2}}$$ is an intermediate output result from denominator terms.

When an IIR filter is fed by constant data or direct current (DC) signals, infinitely, the intermediate output $U(z)$ intends to be stable if the filter is a stable IIR filter. The delayed terms $U(z)z^{-1}$ and $U(z)z^{-2}$ approach $U(z)$, such that $U(z)z^{-1}=U(z)$ $z^{-2}=U(z)$, while the final output $O(z)$ approaches the input data $I(z)$ infinitely. Eq. 12 becomes:

$$\begin{aligned}O(z) &= (a_0 + a_1 z^{-1} + a_2 z^{-2}) \times U(z) \quad &\text{Eq. 13}\\ &= a_0 U(z) + a_1 U(z) z^{-1} + a_2 U(z) z^{-2}\\ &= a_0 U(z) + a_1 U(z) + a_2 U(z)\\ &= (a_0 + a_1 + a_2) U(z)\\ &= I(z)\end{aligned}$$

and therefore:

$$U(z) = \frac{I(z)}{(a_0 + a_1 + a_2)}. \quad \text{Eq. 14}$$

Eq. 14 gives an initial coefficient $$c_{init} = \frac{1}{(a_0 + a_1 + a_2)}$$

by which the first video line can be multiplied and used to flush all line buffers. In this example, the initial coefficient $c_{init}$ is a reciprocal of a summation of numerator coefficients of an IIR filter.

Figure 10:
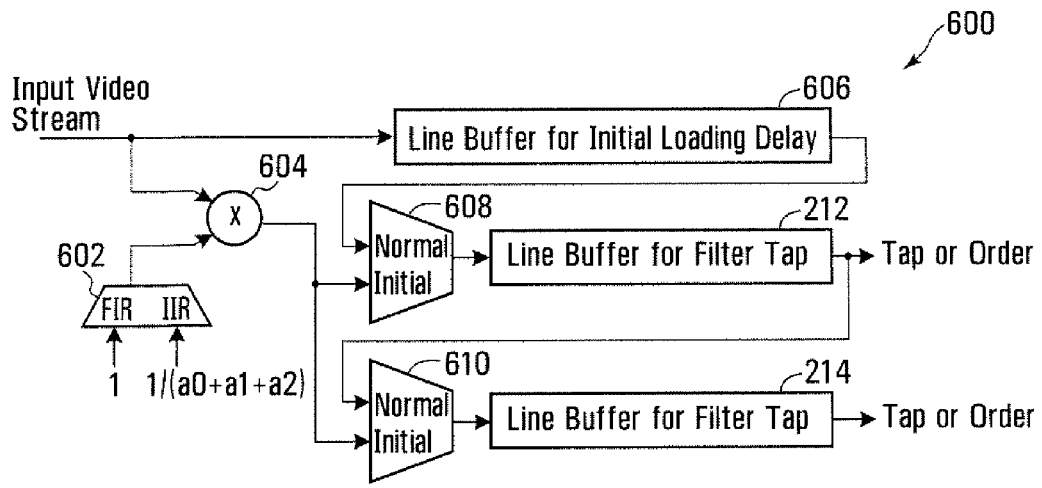
FIG. 10 is a block diagram of an example initializer.

To implement this type of initial loading, an extra line buffer and multiplication can be added in front of the hybrid filter structure of FIG. 9. FIG. 10 is a block diagram of an example initializer 600, which includes an extra line buffer 606, a multiplier 604, and multiplexers 602, 608, 610.

In the structure 600, the coefficient for the pre-multiplier 604 coefficient is set to $c_{init}=1$ for FIR filtering or to $$c_{init} = \frac{1}{(a_0 + a_1 + a_2)}$$

for IIR filtering. Each line buffer 212, 214 for the related filter support (tap or order) is fed by a pre-multiplied video line during the first video line period, and is then fed by the preceding line buffer's output during the normal video filtering period.

Since one more line buffers 606 would be added to the front end of a hybrid FIR-IIR filter, the final filter phase delay is increased by 1. The values for $\tau_{FIR}$ and $\bar{\tau}_{IIR}$ could be increased by 1 to compensate for this different delay.

The multiplier 604 in the initializer 600 does not necessarily involve implementation of an additional multiplier. Since pre-multiplication for initialization would be performed before processing valid video lines, any of the multipliers in the hybrid FIR-IIR filter structure of FIG. 9, for example, could be used for this pre-multiplication, instead of its primary function, during an initial loading period. In some embodiments, additional multiplexers or other types of selectors could be provided to select between initialization and normal operation.

Operation of the examples shown in FIGS. 6 to 10 will now be considered in more detail, with reference primarily to FIG. 9.

A filtering apparatus according to an embodiment of the invention may include a hybrid filter that is controllable to apply either FIR filtering or IIR filtering for vertical filtering of a video image during a resizing process. A controller 524 is operatively coupled to the hybrid filter, and determines a scale factor by which the video image is to be resized in the resizing process. This determination need not involve actual ultimate control of the scale factor. An image resizing process might be controlled, for example, by a user through an input device on a video switcher panel. A scale factor in this case is dependent on user inputs rather than a control action by the controller 524. Thus, determination of the scale factor by the controller 524 involves determining in the sense of receiving or otherwise discerning by how much an image is to be resized, as opposed to determining in the sense of setting the scale factor.

The controller 524 controls the hybrid filter to apply FIR filtering for the vertical filtering where the determined scale factor satisfies a first condition relative to a threshold value $S_T$ or to apply IIR filtering for the vertical filtering where the determined scale factor satisfies a second condition relative to the threshold value $S_T$. The first condition is different from the second condition. Decisions to apply FIR filtering or IIR filtering are then mutually exclusive, so that only one type of filter is applied at any time.

The inverse scale factor $s_{inv}$ of a linear geometrical inverse mapping function of the resizing process, which is described above, is an example of a scale factor that could be used in determining which type of filtering to apply. In this case, the controller 524 controls the hybrid filter to apply FIR filtering where $s_{inv} \leq S_T$ or to apply IIR filtering where $s_{inv} > S_T$. Other scale factors and threshold conditions could instead be used. For example, IIR filtering could be applied instead of FIR filtering at the threshold switch condition $s_{inv}=S_T$. A forward mapping scale factor, or potentially some other measure of the extent to which an image is to be resized, could form the basis of a filtering type decision.

An example of how the controller 524, the coefficient generator 526, or possibly another component such as an off-line processing element which pre-calculates filter coefficients and/or other parameters could calculate the threshold value $S_T$, based on generating and comparing magnitude response curves, has been described above. The foregoing description also includes examples of a linear mapping function which could be calculated by the controller 524 or possibly another component to embed a constant phase delay $\tau$ from either (i) an approximation $\bar{\tau}_{IIR}$ of IIR filtering phase delay where IIR filtering is applied or (ii) a constant FIR filtering phase delay $\tau_{FIR}$ where FIR filtering is applied.

The controller 524 also provides an indication that an output of the hybrid filter is valid were a geometric inverse mapping function is satisfied. Considering the example inverse mapping function in Eq. 7, when the integer parts on both sides of Eq. 7 are equal, a pixel value at location $x_{tgt}$ is valid, and the value calculated for p is also valid. Thus, the output enable signal implements a resizing function as well, since it enables filter outputs that provide valid values for pixels in the target "resized" image grid. This is equivalent in effect to down sampling the filtered data. Such down sampling could potentially be implemented, for example, using a sampler controlled by the output enable signal, or through control of which filtered data are stored to memory or ignored.

The output enable signal is generated by the controller 524, and specifically an inverse mapping engine that is implemented by the controller in some embodiments, when the integer condition of Eq. 7 is satisfied. Where the output enable signal is a one-bit signal, for instance, the signal could be normally held low and driven to high when the filter output is valid. Other signalling schemes could also be used for the output enable signal.

An output enable signal could be used for other purposes as well. For example, the same signal could be used within the controller 524 to increment the $x_{tgt}$ counter to a next target location each time a valid filter output for a current target location is provided. The output enable signal could also or instead be used to latch a valid value of p, for use in the output stage 400 until a next valid value of p is calculated. A latched value of p, or even invalid values of p, could be used in the output stage 400 between valid outputs, since invalid outputs would be ignored.

The hybrid filter includes common filtering components that support either FIR filtering or IIR filtering, and thereby conserves hardware resources. These common filtering components include the multiple video line buffers 212, 214, each of which can store a full video line of pixel data and either (i) support one denominator term and one numerator term of an IIR filter where IIR filtering is applied, or (ii) support two taps of an FIR filter where FIR filtering is applied.

Other common filtering components might include the pairs of multipliers 248A/B, 250A/B 252A/B, 254A/B operatively coupled to each video line buffer 212, 214 to receive respective portions of the data stored in the video line buffers. The filtering coefficient generator 526 is operatively coupled to the multipliers and to the controller 524, to provide a respective filtering coefficient to each multiplier. These filtering coefficients include filter tap coefficients where FIR filtering is applied, and numerator and denominator coefficients where IIR filtering is applied.

Respective adders 242, 244 are operatively coupled to pairs of multipliers that receive the numerator coefficients and to pairs of multipliers that receive the denominator coefficients where IIR filtering is applied. The multipliers 248A/B, 252A/B are operatively coupled to the adder(s) at 242, and the multipliers 250A/B, 254A/B are operatively coupled to the adder(s) at 244.

As noted above with reference to FIG. 5, LSB and/or MSB products are shifted prior to addition where IIR filtering is applied. The hybrid filter may therefore also include shift elements, operatively coupled to at least one multiplier of each multiplier pair, to each adder, and to the controller 524. These shift elements, under control of the controller 524, apply a relative bit shift between outputs of the multipliers of each pair before addition occurs where IIR filtering is applied. This type of shifting could be incorporated within the adders or implemented separately.

Selectivity between loading a video line buffer memory element from the FIR connection 302 or input data is provided in FIG. 9 by the multiplexer 523, which is operatively coupled to one of the video line buffers 212, to the controller 524, and to receive input data to be stored in the video line buffer 212 and a portion of the data already stored in the other video line buffer 214. The multiplexer 523 provides the received input data to the video line buffer 212 where IIR filtering is applied, and provides the received portion of the data stored in the video line buffer 214 to the video line buffer 212 where FIR filtering is applied.

A filter output stage 400 may be operatively coupled to the controller 524 and to receive an output of the hybrid filter. An additional FIR filter tap could be provided by the output stage 400 where FIR filtering is applied by the hybrid filter. In the case of IIR filtering by the hybrid filter, the output stage 400 can be controlled by the controller 524 to provide a phase shift based on the mapping phase $p=(s_{inv} \times x_{tgt}+o_{inv}+\tau)-x_{src}$, which is calculated by the controller 524.

Within the example output stage 400 (FIG. 8), the multiplier 408 is coupled to receive the output of the hybrid filter. The multiplexer 406 is operatively coupled to the multiplier 408 and to the controller 524, to provide a constant to the multiplier where FIR filtering is applied by the hybrid filter and to provide p to the first multiplier where IIR filtering is applied by the hybrid filter. The multiplexer 402 is operatively coupled to the controller 524, to a delay element in the form of the additional line buffer 404, and to receive the output of the hybrid filter and an output from a last line buffer 214 of the hybrid filter. This multiplexer 402 provides the output of the hybrid filter to the line buffer 404 where IIR filtering is applied by the hybrid filter and provides the output from the last line buffer 214 of the hybrid filter to the line buffer 404 where FIR filtering is applied by the hybrid filter. The other multiplier 412 is operatively coupled to the line buffer 404, and the multiplexer 414 is operatively coupled to the multiplier and to the controller 524. The multiplexer 414 provides a coefficient for the additional FIR filtering tap to the multiplier 412 where FIR filtering is applied by the hybrid filter and provides 1-p to the multiplier 412 where IIR filtering is applied by the hybrid filter. The adder 410 is operatively coupled to the multipliers 408, 412, as shown.

In some embodiments, a coefficient initializes such as 600 (FIG. 10) is operatively coupled to the hybrid filter and to the controller 524 (FIG. 9) to initialize the hybrid filter with either a first line of the video image where FIR filtering is applied, or with the first line of the video image multiplied with an initial coefficient value $c_{init}$ where IIR filtering is applied. The example initializer 600 includes a multiplier 604 coupled to receive the first line of the video image and a multiplexer 602 operatively coupled to the multiplier and to the controller 524, to provide a value of 1 to the multiplier where FIR filtering is applied by the hybrid filter, or the initial coefficient value $c_{init}$ where IIR filtering is applied by the hybrid filter. A reciprocal of a summation of numerator filtering coefficients from an IIR filter, as shown in FIG. 10 and described above, is one example of the initial coefficient value $c_{init}$.

Figure 11:
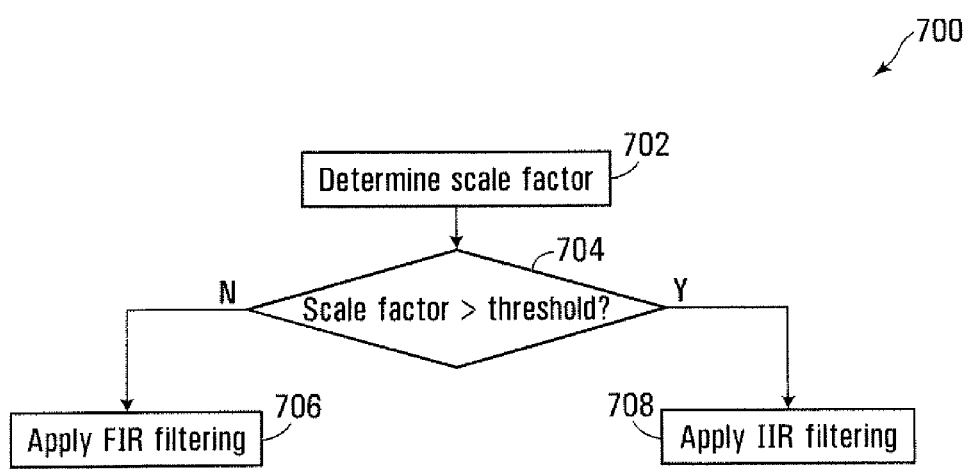
FIG. 11 is a flow diagram of an example method.

FIG. 11 is a flow diagram of an example filtering method 700, which involves determining at 702 a scale factor by which a video image is to be resized in a resizing process, and applying either FIR filtering or IIR filtering for vertical filtering of the video image during the resizing process. In general, FIR filtering is applied where the determined scale factor satisfies a first condition relative to a threshold value $S_T$, and IIR filtering is applied where the determined scale factor satisfies a second condition relative to the threshold value $S_T$. In the example shown, a determination is made at 704 as to whether the determined scale factor is greater than the threshold value $S_T$. If so, then IIR filtering is applied at 708, and otherwise FIR filtering is applied at 706.

The example method 700 is intended solely for the purposes of illustration. Other embodiments may include further, fewer, and/or different operations which are performed in a similar or different manner than shown. Such variations might be or become apparent, for example, from the foregoing description of FIGS. 5 to 10.

What has been described is merely illustrative of the application of principles of embodiments of the invention. Other arrangements and methods can be implemented by those skilled in the art without departing from the scope of the present invention.

For example, FIGS. 5 to 10 illustrate examples of filters and related components. A system in which or in conjunction with which embodiments of the invention could be implemented may include other components as well. It should therefore be appreciated that the contents of the drawings are intended solely for illustrative purposes, and that the present invention is in no way limited to the particular example embodiments explicitly shown in the drawings and described herein.

Figure 12:
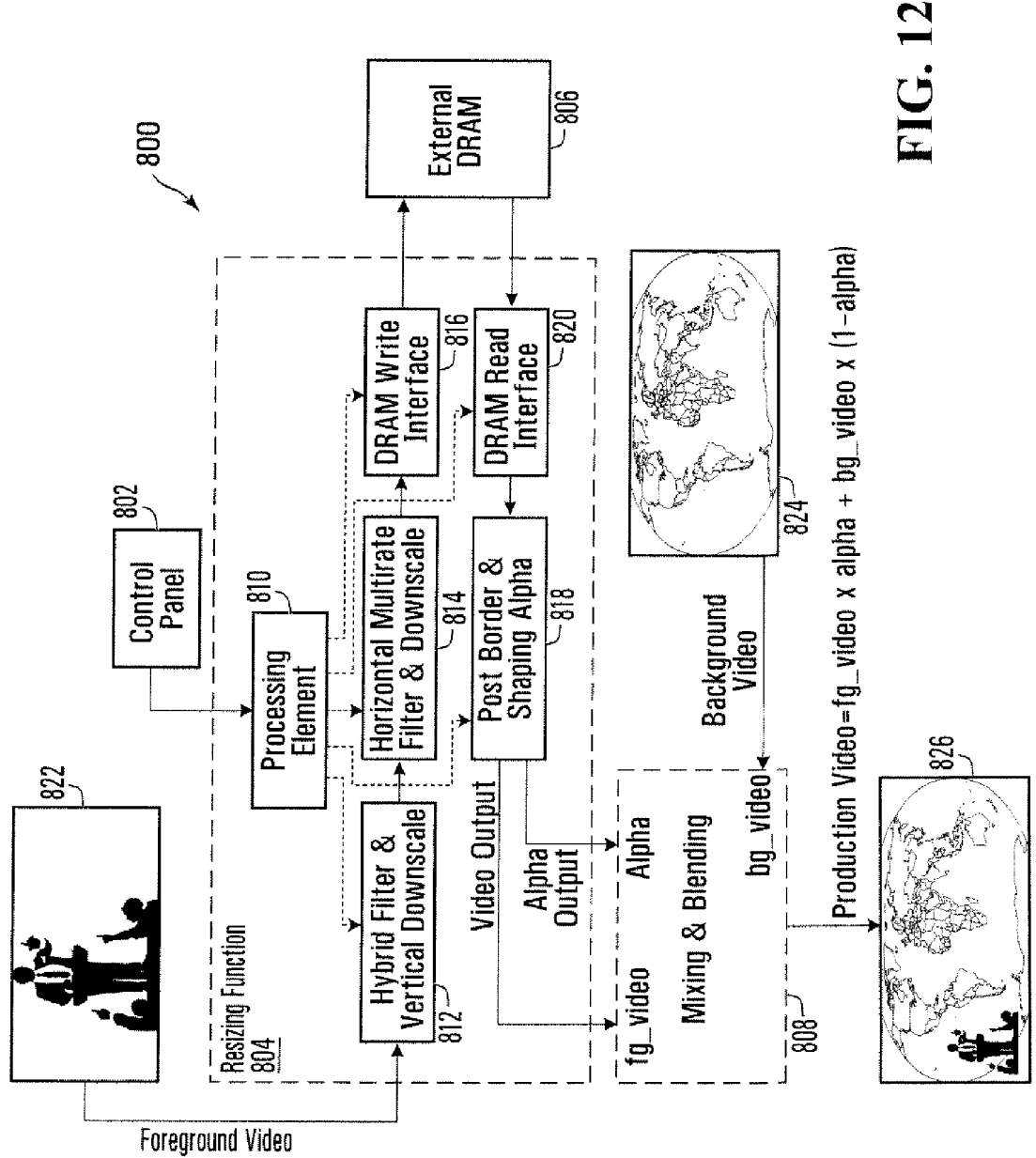
FIG. 12 is a system diagram of an example application of a hybrid filter in a video image resizing function.

FIG. 12 is a system diagram of an example application of a hybrid filter in a video image resizing function. The example system 800 includes a control panel 802, which might include such components as a joystick and/or a fader to control video image size and position. In the example system 800, a resizing function 804 includes a hybrid filter and vertical downscale module 812, a horizontal multirate filter and downscale module 814, DRAM write and read interfaces 816, 820 which enable data to be written to and read from an external DRAM 806, and a post border and shaping alpha module 818. Any or all of these modules could be implemented, for example, in a CPU or other component having sufficient speed and processing capabilities to perform video image resizing. While a processing element 810, which might also be implemented as a microprocessor or CPU, has been shown in FIG. 12, this processing element is intended to represent a component that performs calculations for various parameters that are provided to the other modules 812, 814, 816, 818, 820. These calculations are not as intensive as actual video processing, and accordingly a slower processor could be used as the processing element 810. The resizing function 804 outputs video image data to a mixing and blending module 808.

Through the control panel 802, an operator produces a series of instructions for gradually squeezing and moving a foreground video, shown at 822. These instructions are sent to the processing element 810 to calculate related geometrical parameters such as scale and shift offset, and then these geometrical parameters are fed into hybrid filter and vertical downscale module 812 and the horizontal multirate filter and downscale module 814 for processing.

In the hybrid filter and vertical downscale module 812, the hybrid filter operates as described above to filter the foreground video 822. Filtering coefficients, other parameters, and/or control signals for controlling whether FIR or IIR filtering is applied, may be generated by the processing element 810 or within the hybrid filter and vertical downscale module 812. Vertical downscaling, by down sampling filtered data output from the hybrid filter as noted above, is performed on the basis of Eq. 7. Whenever Eq. 7 is satisfied, continuously filtered data are sampled. If Eq. 7 is not satisfied, then the filtered data would be ignored. Downscale control could be implemented by the controller 524 (FIG. 9) in the hybrid filter and vertical downscale module 812, for example. The output enable signal generated by the controller 524, as described above, provides an indication of when a hybrid filter output is a valid pixel value for a target grid location. Output filtered video image lines could be ignored when the output enable signal is not asserted.

The horizontal multirate filter 814 receives and filters vertical filtered data and stores resultant horizontal and vertical filtered data to the external DRAM 806 through the write interface 816.

In one embodiment, the horizontal multirate filter and downscale module 814 is physically cascaded with the hybrid filter and vertical downscale module 812, and each full line of vertical filtered video data is received as by the horizontal multirate filter and downscale module. After filtering in the horizontal multirate filter and downscale module 814, the filtered video line may be shrunk horizontally and then sent to the DRAM 806. The output enable signal from the hybrid filter and vertical downscale module 812 is delayed to match the horizontal filter pipeline delay, and controls the DRAM write interface 816 to either store the final horizontally and vertically filtered and down scaled video line data in the DRAM 806, or ignore it. Valid filtered lines are stored, and invalid lines are ignored and not stored.

The horizontal multirate filter and downscale module 814 might also implement a form of inverse mapping for a horizontal filter. In this case, a horizontal inverse mapping engine could generate a horizontal output enable signal to indicate valid horizontal filtered data for a target image grid. The horizontal output enable signal is then combined with the delayed vertical output enable signal and sent to the DRAM write interface 816 to indicate which parts of the filtered data, which was first filtered vertically and then horizontally in the example shown in FIG. 12, is to be stored in the DRAM 806. Non-enabled invalid data would be ignored and not stored. This type of single pass filtering can save significant memory bandwidth and capacity since only valid resized image data would be stored and the memory is accessed only twice (once to write data and once to read the data). Two-pass resizing, however, involves four memory access operations, to write filtered vertical data, to read back the filtered vertical data for horizontal filtering, to write the filtered horizontal data, and then to read final output data.

The stored data can then be read from the external DRAM 806 by the post border and shaping alpha module 818 through the DRAM read interface 820. The post border and shaping alpha module 818 adds a frame around the resized foreground video if required by the operator. The size and color of the frame can also be changed by the operator. Shaping alpha refers to a gray-value box. A high value box is the size of the resized foreground video, and outside this box are low values or zeros. When blending resized foreground video with background video at 808, the shaping alpha enables the foreground and background video to be delineated, by indicating where the foreground video is and where the background video is.

The resized video image output from the resizing function 804 is mixed and blended with background video 824 by the mixing and blending module 808 to generate production video 826, for display and/or broadcast.

Regarding other variations, the divisions of function between components, such as the controller 524 and the coefficient generator 526 in FIG. 9 for instance, are also intended solely for illustrative purposes. Various functions as described herein could be distributed differently, among other components of the system shown in FIG. 12 for instance. The specific order in which components are interconnected could also vary between different embodiments of the invention.

The invention is also not in any way restricted to 2nd-order IIR filters or to 6-tap FIR filters. These specific examples are intended for illustrative purposes. The principles disclosed herein could also be applied to filters having different numbers of taps and/or orders. For instance, a cascade of in IIR filters of 1st order can be topologically re-formed to a (2m+2)-tap IIR filter, or an nth-order of IIR filter can be re-formed to a (2n+2)-tap FIR filter.

In addition, although described primarily in the context of methods and systems, other implementations of the invention are also contemplated, as instructions stored on a computer-readable medium such as a disk, memory device, or other physical storage medium, for example.

We claim:

1. A filtering apparatus comprising:
    a hybrid filter that is controllable to apply either Finite Impulse Response (FIR) filtering or Infinite Impulse Response (IIR) filtering for vertical filtering of a video image during a resizing process; and
    a controller, operatively coupled to the hybrid filter, that determines a scale factor by which the video image is to be resized in the resizing process, and controls the hybrid filter to apply FIR filtering for the vertical filtering where the determined scale factor satisfies a first condition relative to a threshold value $S_T$ or to apply IIR filtering for the vertical filtering where the determined scale factor satisfies a second condition relative to the threshold value $S_T$, the first condition being different from the second condition.

2. The apparatus of claim 1, wherein the scale factor comprises an inverse scale factor $s_{inv}$ of a linear geometrical inverse mapping function of the resizing process, and wherein the controller controls the hybrid filter to apply FIR filtering where $s_{inv} \leq S_T$ or to apply IIR filtering where $s_{inv} > S_T$.

3. The apparatus of claim 2, wherein the threshold value $S_T$ comprises a value calculated by determining a number of taps for the FIR filtering and a filter order for the IIR filtering; generating FIR filtering magnitude response curves $C_i^{FIR}(f)$ where $i \in [1,M]$ and $f \in [0,1]$ for M FIR filtering cutoff frequencies and N IIR filter magnitude response curves $C_j^{IIR}(f)$ where $j \in [1,N]$ and $f \in [0,1]$ for N IIR filtering cutoff frequencies; determining curve differences $$\sum_f W(f) \times |C_i^{FIR}(f) - C_j^{IIR}(f)|,$$

where W(f) is a weight function, between FIR filtering magnitude response curves $C_i^{FIR}(f)$ and IIR filtering magnitude response curves $C_j^{IIR}(f)$; identifying the FIR filtering cutoff frequency $f_{min}^{FIR}$ associated with the FIR filtering magnitude response curve having a lowest determined curve difference; and calculating the threshold value $S_T = 1/f_{min}^{FIR}$.

4. The apparatus of claim 2, wherein a normalized filter bandwidth B is related to the inverse scale factor $s_{inv}$ as $B=1/s_{inv}$, and wherein the normalized filter bandwidth B and the inverse scale factor $s_{inv}$ are further related to a filter cutoff frequency as $s_{inv}=1/f_{cutoff}^{FIR}$ and $B=f_{cutoff}^{FIR}$ where FIR filtering is applied, and in a polynomial function of $s_{inv}$ and $f_{cutoff}^{IIR}$ with $B \neq f_{cutoff}^{IIR}$ where IIR filtering is applied.

5. The apparatus of claim 2, wherein a linear mapping function of the resizing process comprises the linear geometrical inverse mapping function and a constant phase delay $\tau$ from either (i) an approximation $\bar{\tau}_{IIR}$ of IIR filtering phase delay where IIR filtering is applied or (ii) a constant FIR filtering phase delay $\tau_{FIR}$ where FIR filtering is applied.

6. The apparatus of claim 5, wherein the phase delay approximation $\bar{\tau}_{IIR}$ comprises one of:
    an average of variable IIR filtering phase delay $\tau_{IIR}(f)$ within 3 dB bandwidth of the IIR filtering in the frequency domain such that $$\bar{\tau}_{IIR} = \frac{1}{B_{3dB}^{IIR}} \sum_{f=0}^{B_{3dB}^{IIR}} \tau_{IIR}(f);$$

and
    a sum of a statistically weighted variable phase delay $$\bar{\tau}_{IIR} = \sum_{f=0}^{1} w(f) \tau_{IIR}(f),$$

where w(f) is a statistical distribution function.

7. The apparatus of claim 6, wherein the linear geometrical inverse mapping function comprises $x_{src} = \lfloor s_{inv} \times x_{tgt} + o_{inv} + \tau \rfloor$, where $\lfloor \cdot \rfloor$ denotes a floor operation $x_{src}$ is an integer counter for source pixel location of each pixel in the video image prior to resizing, $x_{tgt}$ is an integer counter for target pixel location of each pixel in the video image after resizing, and $o_{inv}$ is geometrical inverse shift offset, and wherein an output of the FIR filtering by the hybrid filter provides a target pixel value at location $x_{tgt}$ where FIR filtering is applied and an output of the IIR filtering by the hybrid filter provides part of a target pixel value at location $x_{tgt}$ where IIR filtering is applied.

8. The apparatus of claim 7, wherein the controller further provides an indication that an output of the hybrid filter is valid where the linear geometric inverse mapping function is satisfied.

9. The apparatus of claim 1, wherein the hybrid filter comprises common filtering components that support either FIR filtering or IIR filtering.

10. The apparatus of claim 9, wherein the common filtering components comprises multiple video line buffers, each video line buffer for storing a full video line of pixel data and either (i) supporting one denominator term and one numerator term of an IIR filter where IIR filtering is applied, or (ii) supporting two taps of an FIR filter where FIR filtering is applied.

11. The apparatus of claim 10, wherein the common filtering components further comprise:
    pairs of multipliers operatively coupled to each video line buffer to receive respective portions of the data stored in the video line buffers;
    a filtering coefficient generator, operatively coupled to the multipliers and to the controller, to provide a respective filtering coefficient to each multiplier, the filtering coefficients comprising filter tap coefficients where FIR filtering is applied and numerator and denominator coefficients where IIR filtering is applied; and
    respective adders operatively coupled to pairs of multipliers that receive the numerator coefficients and to pairs of multipliers that receive the denominator coefficients where IIR filtering is applied.

12. The apparatus of claim 11, wherein the common filtering components further comprise respective shift elements, operatively coupled to at least one multiplier of each pair, to each adder, and to the controller, the shift elements applying a relative bit shift between outputs of the multipliers of each pair before addition occurs where IIR filtering is applied.

13. The apparatus of claim 10, wherein the common filtering components further comprise:
    a multiplexer operatively coupled to one of the video line buffers, to the controller, and to receive input data to be stored to the one of the video line buffers and a portion of the data stored in another one of the video line buffers, the multiplexer providing the received input data to the one of the video line buffers where IIR filtering is applied, and providing the received portion of the data stored in the other video line buffer to the one of the video line buffers where FIR filtering is applied.

14. The apparatus of claim 1, further comprising:
a filter output stage, operatively coupled to the controller and to receive an output of the hybrid filter, the filter output stage providing an additional FIR filter tap where FIR filtering is applied by the hybrid filter or a phase shift where IIR filtering is applied by the hybrid filter.

15. The apparatus of claim 7, further comprising:
a filter output stage, operatively coupled to the controller and to receive an output of the hybrid filter, the filter output stage providing an additional FIR filter tap when FIR filtering is applied by the hybrid filter or a phase shift where IIR filtering is applied by the hybrid filter, wherein the controller determines a mapping phase $p=(s_{inv} \times x_{tgt} + o_{inv} + \tau) - x_{src}$, wherein the phase shift is based on the determined phase p.

16. The apparatus of claim 15, wherein the filter output stage comprises:
a first multiplier coupled to receive the output of the hybrid filter;
a first multiplexer operatively coupled to the first multiplier and to the controller, to provide a constant to the first multiplier where FIR filtering is applied by the hybrid filter and to provide p to the first multiplier where IIR filtering is applied by the hybrid filter;
a second multiplexer operatively coupled to the controller, to a delay element, and to receive the output of the hybrid filter and an output from a last line buffer of the hybrid filter, the second multiplexer providing the output of the hybrid filter to the delay element where IIR filtering is applied by the hybrid filter and providing the output from the last line buffer of the hybrid filter to the delay element where FIR filtering is applied by the hybrid filter;
a second multiplier operatively coupled to the delay element;
a third multiplexer operatively coupled to the second multiplier and to the controller, to provide a coefficient for the additional FIR filtering tap to the second multiplier where FIR filtering is applied by the hybrid filter and to provide 1-p to the second multiplier where IIR filtering is applied by the hybrid filter; and
an adder operatively coupled to the first multiplier and to the second multiplier.

17. The apparatus of claim 1, further comprising:
a coefficient initializer operatively coupled to the hybrid filter and to the controller to initialize the hybrid filter with either a first line of the video image where FIR filtering is applied, or with the first line of the video image multiplied with an initial coefficient value $c_{init}$ where IIR filtering is applied.

18. The apparatus of claim 17, wherein the initializer comprises a multiplier coupled to receive the first line of the video image and a multiplexer operatively coupled to the multiplier and to the controller, to provide a value of 1 to the multiplier where FIR filtering is applied by the hybrid filter, or the initial coefficient value $c_{init}$ as a reciprocal of a summation of numerator filtering coefficients from an IIR filter where IIR filtering is applied by the hybrid filter.

19. A filtering method comprising:
determining a scale factor by which a video image is to be resized in a resizing process; and
applying either Finite Impulse Response (FIR) filtering or Infinite impulse Response (IIR) filtering for vertical filtering of the video image during the resizing process, by applying FIR filtering for the vertical filtering where the determined scale factor satisfies a first condition relative to a threshold value $S_T$ or applying IIR filtering for the vertical filtering where the determined scale factor satisfies a second condition relative to the threshold value $S_T$, the first condition being different from the second condition.

20. The method of claim 19, wherein the scale factor comprises an inverse scale factor $s_{inv}$ of a linear geometrical inverse mapping function of the resizing process, wherein applying FIR filtering comprises applying FIR filtering where $s_{inv} \leq S_T$, and wherein applying IIR filtering comprises applying IIR filtering where $s_{inv} > S_T$.

21. The method of claim 20, further comprising:
determining a number of taps for the FIR filtering and a filter order for the IIR filtering;
generating FIR filtering magnitude response curves $C_i^{FIR}$ (f) where $i \in [1,M]$ and $f \in [0,1]$ for M FIR filtering cutoff frequencies and N IIR filter magnitude response curves $C_j^{IIR}(f)$ where $j \in [1,N]$ and $f \in [0,1]$ for N IIR filtering cutoff frequencies;
determining curve differences $$\sum_f W(f) \times |C_i^{FIR}(f) - C_j^{IIR}(f)|,$$

where W(f) is a weight function, between FIR filtering magnitude response curves $C_i^{FIR}(f)$ and IIR filtering magnitude response $C_j^{IIR}(f)$;
identifying the FIR filtering cutoff frequency $f_{min}^{FIR}$ associated with the FIR filtering magnitude response curve having a lowest determine curve difference; and
calculating the threshold value $S_T = 1/f_{min}^{FIR}$.

22. The method of claim 20, wherein a normalized filter bandwidth B is related to the inverse scale factor $s_{inv}$ as $B=1/s_{inv}$, and wherein the normalized filter bandwidth B and the inverse scale factor $s_{inv}$ are further related to a filter cutoff frequency as $s_{inv}=1/f_{cutoff}^{FIR}$ and $B=f_{cutoff}^{FIR}$ where FIR filtering is applied, and in a polynomial function of $s_{inv}$ and $f_{cutoff}^{IIR}$ with $B \neq f_{cutoff}^{IIR}$ where IIR filtering is applied.

23. The method of claim 20, further comprising:
determining an approximation $\bar{\tau}_{IIR}$ of a variable IIR filtering phase delay $\tau_{IIR}(f)$ where IIR filtering is applied.

24. The method of claim 23, wherein determining the phase delay approximation $\bar{\tau}_{IIR}$ comprises one of:
averaging the variable phase delay $\tau_{IIR}(f)$ within 3 dB bandwidth of the IIR filtering in the frequency domain such that $$\bar{\tau}_{IIR} = \frac{1}{B_{3dB}^{IIR}} \sum_{f=0}^{B_{3dB}^{IIR}} \tau_{IIR}(f);$$

and
summing a statistically weighted variable phase delay $$\bar{\tau}_{IIR} = \sum_{f=0}^{1} w(f) \tau_{IIR}(f),$$

where w(f) is a statistical distribution function.

25. The method of claim 23, further comprising:
determining a linear mapping function for the resizing process, the linear mapping function comprising the linear geometrical inverse mapping function and a constant phase delay τ from either (i) the phase delay approximation $\bar{\tau}_{IIR}$ where IIR filtering is applied or (ii) a constant FIR filtering phase delay $\tau_{FIR}$ where FIR filtering is applied.

26. The method of claim 25, wherein the linear geometrical inverse mapping function comprises $x_{src} = \lfloor s_{inv} \times x_{tgt} + o_{inv} + \tau \rfloor$, where $\lfloor \cdot \rfloor$ denotes a floor operation, $x_{src}$ is an integer counter for source pixel location of each pixel in the video image prior to resizing, $x_{tgt}$ is an integer counter for target pixel location of each pixel in the video image after resizing, and $o_{inv}$ is a geometrical inverse shift offset, and wherein an output of the FIR filtering provides a target pixel value at location $x_{tgt}$ where FIR filtering is applied and an output of the IIR filtering provides part of a target pixel value at location $x_{tgt}$ where IIR filtering is applied.

27. The method of claim 26, further comprising:
providing an indication that an output of the FIR filtering or the IIR filtering is valid where the linear geometric inverse mapping function is satisfied.

28. The method of claim 26, further comprising:
determining a mapping phase $p = (s_{inv} \times x_{tgt} + o_{inv} + \tau) - x_{src}$;
determining a set of FIR filtering coefficients based on the determined mapping phase where FIR filtering is applied; and
shifting the output of the IIR filtering based on the determined mapping phase where IIR filtering is applied.

29. The method of claim 19, wherein applying either FIR filtering or IIR filtering comprises controlling common filtering components to perform either FIR filtering or IIR filtering.

30. The method of claim 19, further comprising:
initializing the FIR filtering with a first line of the video image where FIR filtering is applied, or initializing the IIR filtering with the first line of the video image multiplied with an initial coefficient value $c_{init}$ where IIR filtering is applied.

31. The method of claim 30, wherein the initial coefficient value $c_{init}$ comprises a reciprocal of a summation of numerator filtering coefficients from an IIR filter where IIR filtering is applied.

* * * * *